United States Patent

Rosenfeld et al.

[11] Patent Number: 6,025,860
[45] Date of Patent: *Feb. 15, 2000

[54] DIGITAL DECORATING SYSTEM

[75] Inventors: Jon Rosenfeld, Medford, Mass.; Stephen L. Aroneo, Franklin Lakes, N.J.; Nicolas J. Pollara, Woburn, Mass.

[73] Assignee: GSI Lumonics, Inc., Billerica, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/790,236

[22] Filed: Jan. 28, 1997

[51] Int. Cl.⁷ .................................................. H04N 1/40
[52] U.S. Cl. ..................... 347/171; 347/188; 358/298
[58] Field of Search .................................. 347/185, 186, 347/187, 188, 195; 400/120.09, 120.15; 358/298; 359/110

[56] References Cited

U.S. PATENT DOCUMENTS

| | | | |
|---|---|---|---|
| 3,811,030 | 5/1974 | Veach | 219/237 |
| 4,037,008 | 7/1977 | Tugwell | 428/250 |
| 4,327,636 | 5/1982 | Carey | 101/29 |
| 4,362,529 | 12/1982 | Mizuno et al. | 8/471 |
| 4,415,903 | 11/1983 | Kawanishi et al. | 347/199 |
| 4,541,042 | 9/1985 | Kohashi | 347/179 |
| 4,568,951 | 2/1986 | Hasegawa et al. | 347/171 |
| 4,650,350 | 3/1987 | Dorner | 400/120 |
| 4,661,393 | 4/1987 | Uchiyama et al. | 428/200 |
| 4,664,672 | 5/1987 | Krajec et al. | 8/472 |
| 4,675,701 | 6/1987 | Chu et al. | 347/200 |
| 4,686,549 | 8/1987 | Williams et al. | 503/227 |
| 4,695,850 | 9/1987 | Nubson | 347/171 |
| 4,740,798 | 4/1988 | Shinoazaki | 347/213 |
| 4,800,397 | 1/1989 | Afzali-Ardakani et al. | 281/5 |
| 4,810,006 | 3/1989 | Katz | 281/5 |
| 4,816,902 | 3/1989 | Yamanishi | 358/75 |

(List continued on next page.)

FOREIGN PATENT DOCUMENTS

| | | | |
|---|---|---|---|
| 5004462 | 1/1963 | Japan | B41M 5/26 |
| 60-008090 | 1/1985 | Japan | B41J 3/20 |
| 61-295088 | 12/1986 | Japan | B41M 5/26 |
| 63-87284 | 4/1988 | Japan | B41M 5/26 |
| 2-88253 | 3/1990 | Japan | B41J 2/38 |
| 288253 | 3/1990 | Japan . | |
| 4-19190 | 1/1992 | Japan | B41M 5/30 |

OTHER PUBLICATIONS

"TDK Thin–Film Thermal Print–Heads" Jan. 20, 1997.

*Primary Examiner*—N. Le
*Assistant Examiner*—Anh T. N. Vo
*Attorney, Agent, or Firm*—Samuels, Gauthier & Stevens, LLP

[57] ABSTRACT

A digital decorating system for transferring a selected image to a surface of an article includes a thermal printhead, an advancing mechanism for producing relative movement between the printhead and the surface of the article, and a force member for exerting a selected amount of pressure between the thermal line of pixels and the surface of the article. The thermal printhead includes a plurality of energizable heater elements constructed to deliver heat to a thermal line of pixels on a surface of the printhead. The digital decorating system also includes a microcontroller operatively connected to the printhead, the force member and the advancing mechanism to provide control signals selectively delivering heat to pixels of the thermal line and selectively causing the movement thereby thermally transferring, over a two dimensional array of pixels, a two dimensional image to the article surface. The microcontroller can classify the pixels corresponding to the image into perimeter pixels and interior pixels and control energy levels delivered to produce heat at the perimeter pixels and interior pixels. The energy levels delivered to each pixel cooperatively depend on a level of energy previously delivered to the pixel, on levels of energy delivered to neighboring pixels and on a level of energy required at the pixel to thermally transfer the image to the surface.

35 Claims, 16 Drawing Sheets

U.S. PATENT DOCUMENTS

| | | | |
|---|---|---|---|
| 4,836,105 | 6/1989 | Hoekstra et al. | 101/453 |
| 4,836,697 | 6/1989 | Plotnick et al. | 400/120 |
| 4,837,586 | 6/1989 | Brownstein | 347/205 |
| 4,839,742 | 6/1989 | Nakatani et al. | 358/296 |
| 4,847,237 | 7/1989 | Vanderzanden | 503/227 |
| 4,860,025 | 8/1989 | Berson et al. | 347/217 |
| 4,860,028 | 8/1989 | Ogawa | 347/198 |
| 4,868,676 | 9/1989 | Matsuura et al. | 358/296 |
| 4,882,593 | 11/1989 | Touma et al. | 347/213 |
| 4,963,884 | 10/1990 | Kiguchi et al. | 347/185 |
| 4,968,063 | 11/1990 | McConville et al. | 283/72 |
| 4,968,996 | 11/1990 | Ebihara et al. | 347/202 |
| 4,973,987 | 11/1990 | Koshizuka et al. | 347/197 |
| 4,983,994 | 1/1991 | Mori et al. | 347/196 |
| 4,991,287 | 2/1991 | Piatt et al. | 427/96 |
| 5,021,805 | 6/1991 | Imaizumi et al. | 347/187 |
| 5,037,216 | 8/1991 | Nubson et al. | 400/120 |
| 5,045,865 | 9/1991 | Crystal et al. | 347/114 |
| 5,080,512 | 1/1992 | Schofield et al. | 400/225 |
| 5,091,735 | 2/1992 | Mohri et al. | 347/171 |
| 5,132,705 | 7/1992 | Takeuchi et al. | 347/199 |
| 5,184,344 | 2/1993 | Takeuchi et al. | 369/126 |
| 5,219,641 | 6/1993 | Mehta et al. | 428/211 |
| 5,239,926 | 8/1993 | Nubson et al. | 101/487 |
| 5,251,988 | 10/1993 | Frazier | 400/120 |
| 5,617,216 | 4/1997 | Wada | 358/298 |
| 5,625,399 | 4/1997 | Wiklof et al. | 347/195 |
| 5,627,580 | 5/1997 | Nelson | 347/239 |
| 5,706,098 | 1/1998 | Clark et al. | 358/298 |

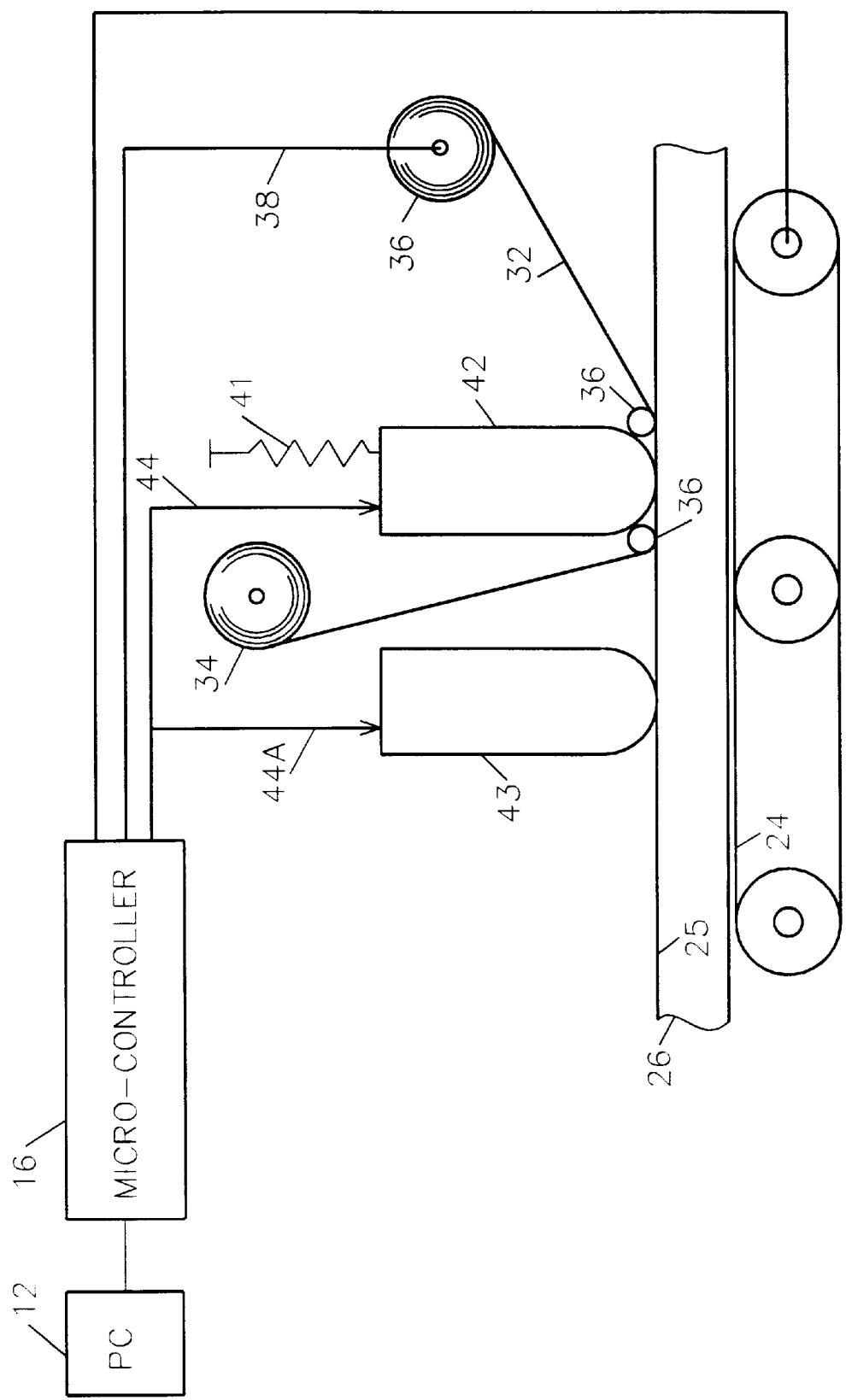

42    FIG. 9A

STRIPE:

1 = ON  0 = OFF

| A | B | C | D | ENERGY COMBINATION DOT E |
|---|---|---|---|---|
| 0 | 0 | 0 | 0 | E1 |
| 0 | 0 | 0 | 1 | E2 |
| 0 | 0 | 1 | 0 | E2 |
| 0 | 0 | 1 | 1 | E3 |
| 0 | 1 | 0 | 0 | E4 |
| 0 | 1 | 0 | 1 | E5 |
| 0 | 1 | 1 | 0 | E5 |
| 0 | 1 | 1 | 1 | E6 |
| 1 | 0 | 0 | 0 | E7 |
| 1 | 0 | 0 | 1 | E8 |
| 1 | 0 | 1 | 0 | E8 |
| 1 | 0 | 1 | 1 | E9 |
| 1 | 1 | 0 | 0 | E10 |
| 1 | 1 | 0 | 1 | E11 |
| 1 | 1 | 1 | 0 | E11 |
| 1 | 1 | 1 | 1 | E12 |

DIGITAL DECORATING SYSTEM

BACKGROUND OF THE INVENTION

This invention relates to decorative transfer of images to various types of coarse surfaces.

Hot stamping of metallic foils has been widely used for decorating, with graphics and text, such items as book covers, wallets, attaché cases, handbags, and suitcases. These articles are made of leathers, vinyls or textiles, which have surfaces with deep grains or fibers having valleys, for example, 0.001 inches or even 0.003 inches in depth. For decorating purposes, the metallic foil, transferred by heat and high pressure, typically has a mirror-like surface for shiny appearance. Furthermore, the transferred material includes a tinted or clear lacquer top layer covering the metal surface to provide protection and a rich gold or other appearance. Traditionally, to transfer the metallic material, one has to first fabricate a custom-made metal die with raised and recessed areas corresponding to the particular design. The raised areas press the foil against the receiving substrate to transfer the material having the desired pattern while heat is applied. The stamping press applies pressures of hundreds of pounds or more to the die. While this type of transfer has been widely used, it also has drawbacks. For example, it takes a relatively long time to fabricate the die and the fabrication process is relatively expensive.

There are other widely used techniques for decorative printing, but they also require fabrication of special tools for different designs. For example, silk screen printing requires fabrication of a print screen and pad printing requires fabrication of a pad.

Computer controlled thermal printing is a different thermal process. It uses a thermal printhead controlled by a computer to print an image, typically, on paper. The thermal printhead generates heat localized over dots of a computer generated pattern to be printed. A thermal printing ribbon, disposed between the printhead and the paper or other web, releases ink that is thermally transferred in tiny amounts to the paper. The ink layer consists of a particulate or liquid-like material. The thermal printing ribbon also includes constituents that facilitate good adherence of the ink dots to the paper surface. The entire process is relatively fast and economical. However, this process has not been equated with hot stamping because of limitations of the process and the materials on which a precise image can be formed.

Thermal printing has been used for decorative printing on papers of varying surface qualities. To improve the quality of the transferred image, printheads have been used to transfer several layers of ink on the same dot or puffing particles have been included in the transfer composition to fill irregularities on the printed surface. In either case, the thermal printing process and its effects have differed significantly from the hot stamping process that transfers relatively larger chunks of metallic material to the surface to achieve a specular effect.

SUMMARY OF THE INVENTION

The invention provides low-cost decorating techniques that can achieve advantages of both thermal printing and hot stamping and can transfer high quality decorative images to rough surfaces. The techniques do not require special tools made individually for different images in order to thermally transfer a continuous metallic foil and create an image with a smooth specular surface of the transferred metal on different types of substrates.

The novel digital decorating techniques generate high quality decorative images by computer-control. The decorating techniques produce images on rough or very rough surfaces while still achieving transfer of fine lines and edges and uniform fill of large areas. The thermal transfer system is constructed to deliver varying amounts of energy to pixels of the image depending upon important different parameters of the transfer system, the deposition surface and the image. While aspects of the invention can use only relatively few different energy states and take into account only few process variables and transfer good quality images in many instances, other aspects of the invention provide the flexibility to employ a large number of variables and many different energy states for each pixel to further improve the transferred image. By employing different novel algorithms, different pixels are heated to different temperatures to generate high quality images.

According to one important embodiment, a digital decorating system for transferring a selected image to a surface of an article includes a thermal printhead, an advancing mechanism for producing relative movement between the printhead and the surface of the article, and a force member for exerting a selected amount of pressure between the thermal line of pixels and the surface of the article. The thermal printhead includes a plurality of energizable heater elements constructed to deliver heat to a thermal line of pixels on a surface of the printhead. The digital decorating system also includes a microcontroller operatively connected to the printhead, the force member and the advancing mechanism to provide control signals selectively delivering heat to pixels of the thermal line and selectively causing the movement thereby thermally transferring, over a two dimensional array of pixels, a two dimensional image to the article surface. The microcontroller can classify the pixels corresponding to the image into perimeter pixels and interior pixels and control energy levels delivered to produce heat at the perimeter pixels and the interior pixels. The energy levels delivered to each pixel cooperatively depend on a level of energy previously delivered to the pixel, on levels of energy delivered to neighboring pixels and on a level of energy required at the pixel to thermally transfer the image to the surface.

The thermal line of pixels may press directly onto the surface of the article to transfer the image by thermally altering the surface of the article. The digital decorating system may further include a thermal foil with a metallic layer located between the thermal line and the surface of the article.

The pixel may be a perimeter pixel relative to the image and the microcontroller may be arranged to provide to the perimeter pixel an energy level substantially above a threshold level of energy required for thermal transfer of material from the thermal foil thereby creating a substantial gradient of temperature between the perimeter pixel and a neighboring pixel outside of the image. The substantial gradient enhances the thermal transfer of the metallic layer to the surface.

The pixel may be a perimeter pixel of the image that, together with neighboring perimeter pixels, form a line of the image at an acute angle relative to the thermal line. Then the microcontroller provides to the perimeter pixel an energy level above a threshold level of energy required for thermal transfer of material from the thermal foil. The microcontroller also provides to a pixel outside of the image and in a corner neighboring two the perimeter pixels an energy level below the threshold level. The selected angle may be from about 30 degrees to about 60 degrees.

The perimeter pixel may immediately precede several pixels that received energy substantially below the threshold level. Then the microcontroller provides to the perimeter pixel an energy level substantially above the threshold level thereby creating a substantial gradient of temperature between the perimeter pixel and a neighboring pixel. The substantial gradient causes thermal transfer of the metallic layer to the surface.

If the perimeter pixel immediately follows several interior pixels, the microcontroller provides to the perimeter pixel an energy level about equal to the threshold level to cause thermal transfer of the metallic layer to the surface.

The pixel may be an interior pixel and the microcontroller may provide to the interior pixel an energy level below the energy level delivered to the perimeter pixel.

The printhead may include a heat sink and a thermal exchange unit thermally connected to the thermal line and constructed to actively deliver or remove heat from the heat sink. The thermal exchange unit is constructed to actively cool the printhead.

The digital decorating system may further include a surface heater located near the thermal line. The surface heater may be constructed to preheat the surface of the article immediately before the surface reaches the thermal line.

According to another important embodiment, a computer controlled thermal decorator for transferring images from a thermal foil includes a printhead, including a set of heater elements, constructed to thermally transfer a line of pixels from the foil to a rough substrate, and an advancing mechanism constructed to produce relative movement between the printhead and the substrate. This movement enables thermal transfer of an x-y matrix of pixels. The decorator also includes a controller constructed and arranged to examine, for each pixel, the relationship of neighboring of pixels of the matrix to the pixel for forming a selected image, and based upon the relationship of the print status of the pixel and its neighboring pixels, dependently select the level of energy to be applied to the heater element in respect of the pixel from a group of possible energies.

According to another important embodiment of such a system, the examination of neighboring pixels in according to an algorithm that determines whether the pixel lies at an edge of the image and the selection of the energy to be applied depends on that determination. In preferred embodiments of this feature, pixels at an edge are heated to a higher temperature than pixels filling the body of the image, to produce enhanced separation of the foil from the carrier.

According to another important embodiment of such a system, the examination of neighboring pixels determine whether the pixel is in the region of a line lying at an acute angle to the printhead line and the state of energization of the pixel is determined according to a line smoothing algorithm that partially heats unprinted pixels neighboring the feature. According to one embodiment, the algorithm determines if a pixel lies outside the image but in a corner defined by pixels printed or to be printed, in which event the energy selected for the pixel in question heats the pixel below normal pixel printing temperature but sufficiently, in combination with the heating effect of the adjacent pixels, to cause partial transfer of the foil in the corner region of the pixel in question to contribute to line smoothing.

According to another important embodiment, the examination of neighboring pixels according to an algorithm determines whether the pixel is a "fill" pixel, lying in the interior of the image, beyond the edge of the image, and if so, an energy level is selected that is sufficiently low to prevent any discoloration or tarnishing effect on the foil is applied to the pixel.

In another aspect, a computer controlled thermal decorator, for transferring images from a thermal foil, includes a printhead, an advancing mechanism and a controller. The controller examines an image to be printed and increases the energy delivered to heater elements, relative to an average energy, and the energy applied to the leading edge of the image. The controller may be further programmed to increase the energy delivered to heater elements transferring the trailing edge of the image.

In another aspect, a computer controlled thermal decorator, for transferring images from a thermal foil, includes a printhead, an advancing mechanism and a controller. The controller examines an image to be printed and applies power to pixels not to be printed, if the pixels lie in a corner defined by pixels that are to be printed.

In another aspect, a computer controlled thermal decorator for transferring images from a thermal foil, includes a printhead including a line of heater elements that are selectively energized during relative movement to a substrate. The decorator further includes a heater that preheats the substrate to enhance the transfer of the foil. The heater may heat the substrate generally, immediately prior to passing under the printhead. The heater may be in a form of a second printhead that heats the substrate in a pattern related to the pattern to be thermally transferred. The second printhead may have substantially the same number of heater elements as the first mentioned printhead.

In another aspect, a computer controlled thermal decorator, for transferring images to a substrate, includes a printhead including a line of heater elements that are selectively energized during relative movement to a substrate. The heating elements are exposed for direct contact with the substrate to thermally alter the substrate and thereby transfer the image. The decorator may further include a controller constructed and arranged to control power levels suitable for different types of substrates. The substrate may be leather.

In another aspect, a computer controlled thermal decorator for transferring images from a thermal foil includes a printhead, including a set of heater elements, constructed to thermally transfer a line of pixels from the foil to a rough substrate, an advancing mechanism constructed to produce relative movement between the printhead and the substrate. This movement enables thermal transfer of an x-y matrix of pixels. The decorator also includes a controller constructed and arranged to control the energy delivered to the pixels dynamically in relationship to energies delivered to the neighboring pixels that form the image. The printhead includes a heat transfer member constructed to maintain a selected temperature of the printhead. The heat transfer member may be constructed for active heating or cooling.

For certain applications, the controller is advantageously constructed and arranged to transfer the negative of a desired image thereby leaving a well defined decal on the substrate that is subsequently transferred as by use of a heated roll.

Also, in certain circumstances, it is advantageous that the decorator include a second printhead and the controller is constructed and arranged to transfer the negative of a desired image to the foil by employing one printhead thereby leaving a decal and the controller is constructed and arranged to transfer the decal to the substrate by employing the second printhead.

The invention also includes novel methods employed by the above-described systems.

BRIEF DESCRIPTION OF THE DRAWING

FIGS. 6A and 6B are diagrammatic side views of the thermal transfer system, including a second printhead for preheating the substrate, and the thermal foil, respectively.

FIG. 8 is a magnified view of irregularities of an edge produced by a standard thermal transfer, while

FIG. 9A is a diagrammatic plan view of a uniform energy distribution for the thermal image transfer of the image of FIG. 9.

DESCRIPTION OF PREFERRED EMBODIMENTS

Figure 1:
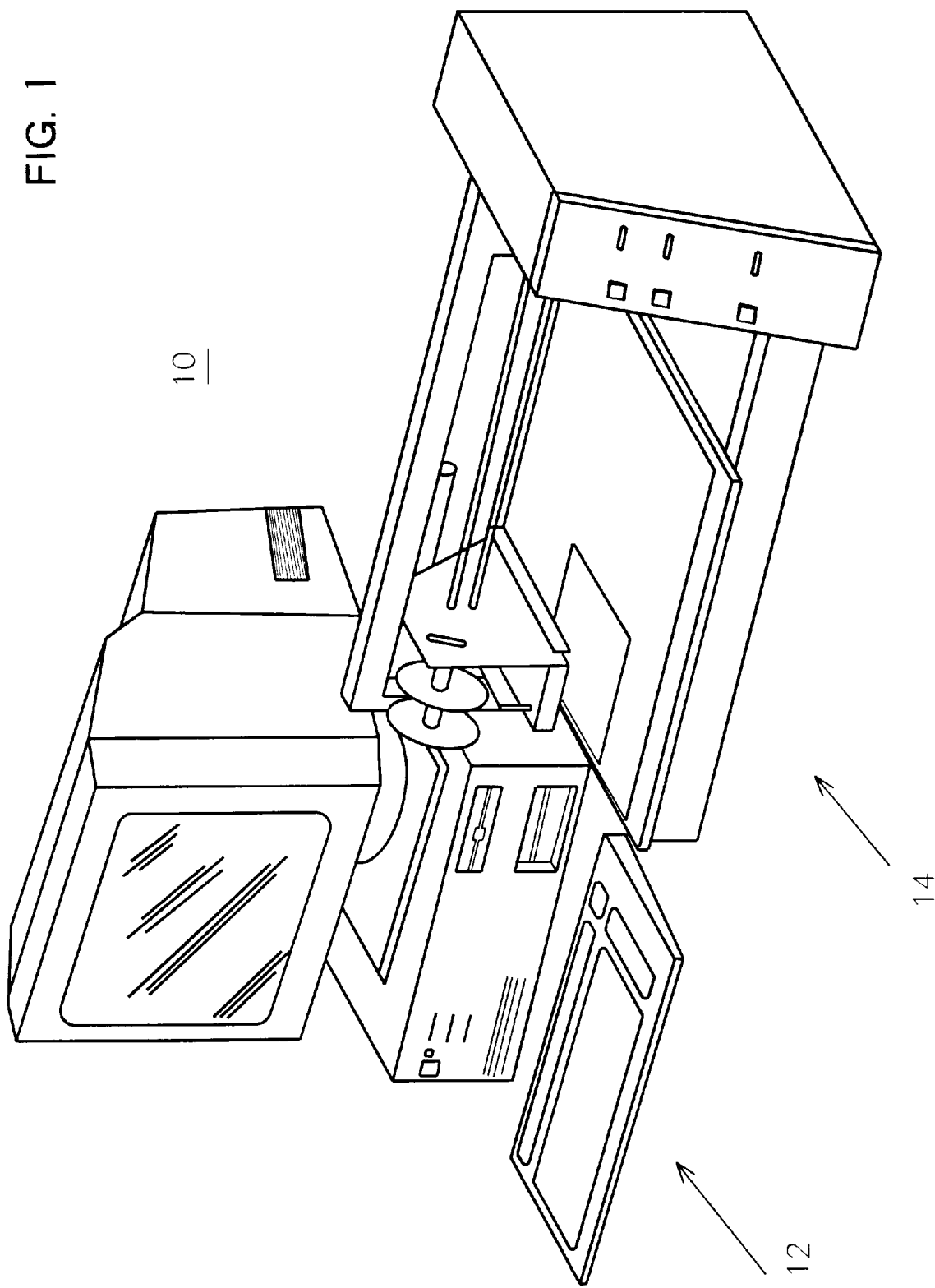
FIG. 1 is a perspective view of a digital decorating system.

Referring to FIG. 1, a digital decorating system 10 includes a personal computer 12 interfaced with a thermal transfer system 14. Computer 12 performs overall control over the digital decorating process and generates a selected image. Thermal transfer system 14 is a compact, table top system for transferring the provided image to a selected surface of an article (for example, vinyl, leather, plastic, textile or paper).

Figure 2:
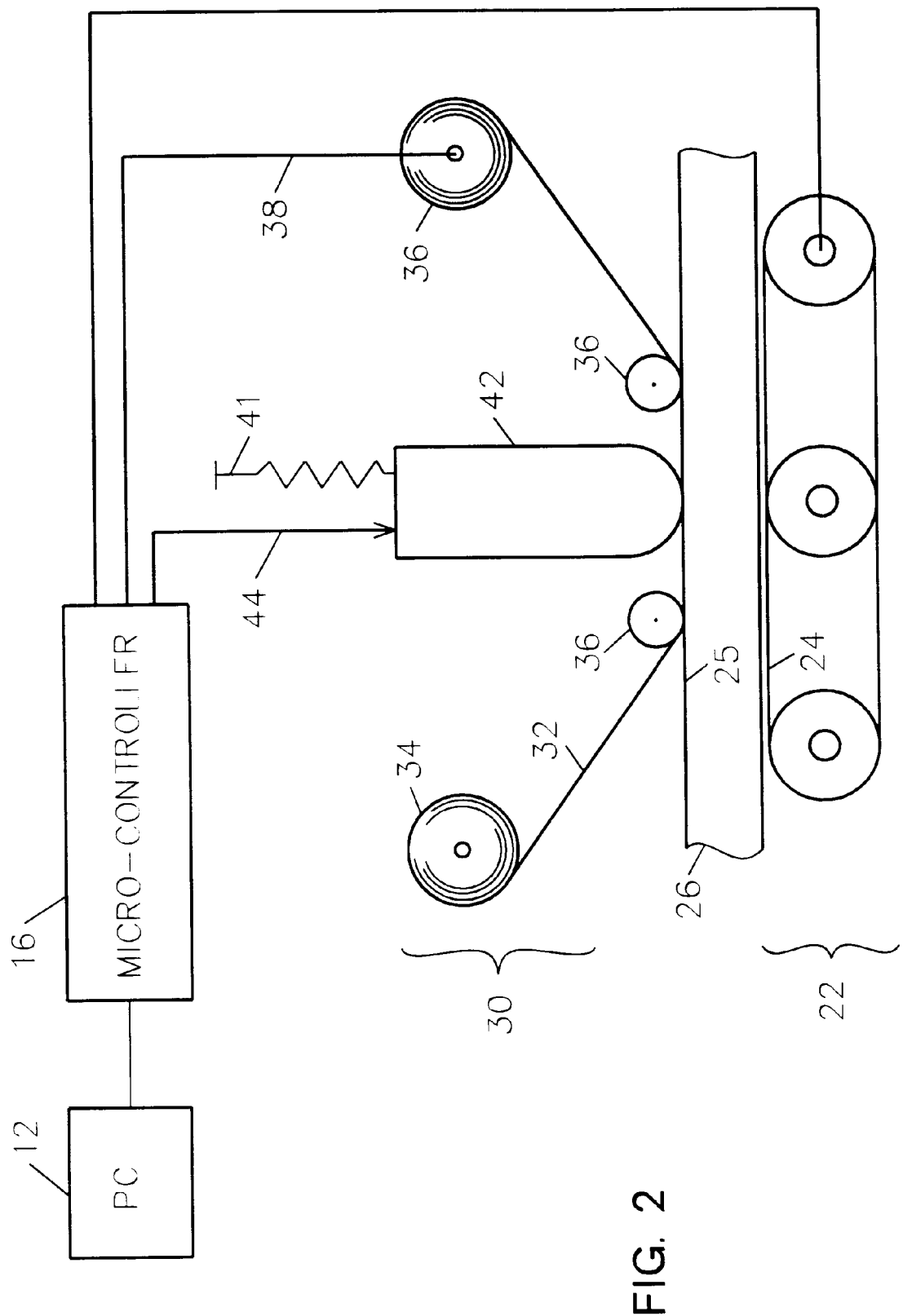
FIG. 2 is a diagrammatic side view of a thermal transfer system.

Referring to FIG. 2, thermal transfer system 14 includes a microcontroller 16, a drive assembly 22, a thermal foil assembly 30, and a thermal printhead assembly 40. Drive assembly 22 (i.e., advancing mechanism) includes a stage 24 constructed to move an article 26 before and during the image transfer process. Drive assembly 22 receives signals 39 from microcontroller 16. Thermal foil assembly 30 includes thermal foil 32 spooled on a supply roll 34 and a set of rollers 36 constructed to advance foil 32 (together with article 26 being advanced by stage 24) at a selected rate determined by control signals 38.

Thermal printhead assembly 40 includes at least one printhead 42 pressed against article 26 by a force member 41 and responsive to control signals 44 from microcontroller 16. Force member 41 is constructed to vary the pressure exerted by the printhead. The pressure is in the range of about 1 to 8 pounds per inch, and preferably about 5 pounds per inch of print line.

Figure 3:
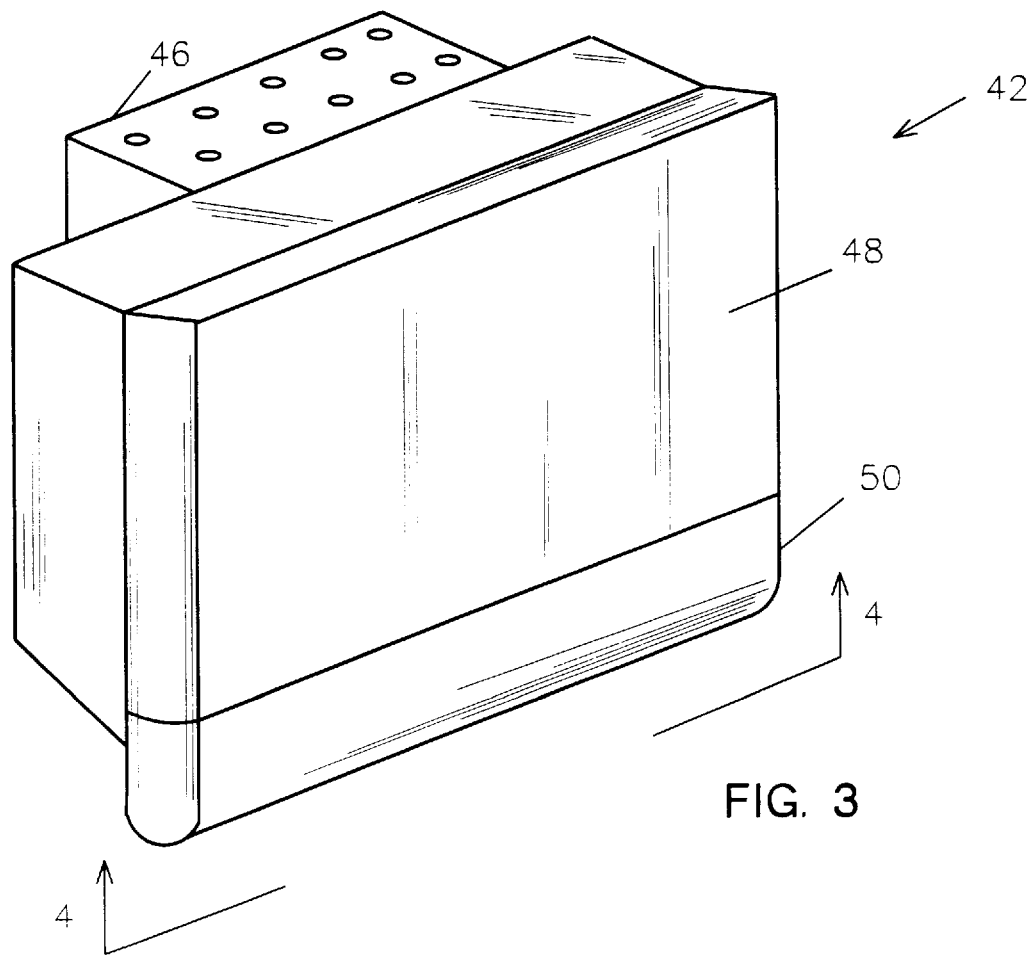
FIG. 3 is a perspective view of a printhead of the thermal transfer system.

Referring to FIG. 3, printhead 42 is an edge type printhead that includes a set of electrical connectors 46, a heat sink 48, and a ceramic member 50. While the thermal printhead assembly is stationary during the thermal transfer process, it can be repositioned to a different location prior to the transfer process. The repositioning achieves easy access to different locations of the decorated items. Electrical connectors 46 are connected to a plurality of energizable heater elements constructed and arranged to selectively heat each of a line of pixels on the surface of ceramic member 50.

Figure 4:
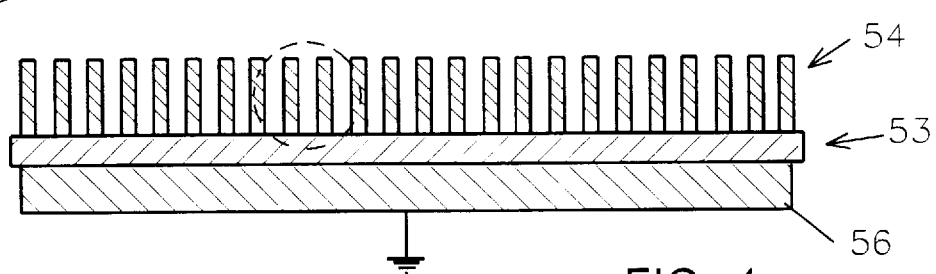
FIG. 4 is a view of the bottom of the printhead taken on line 4—4 of FIG. 3.
Figure 4A:
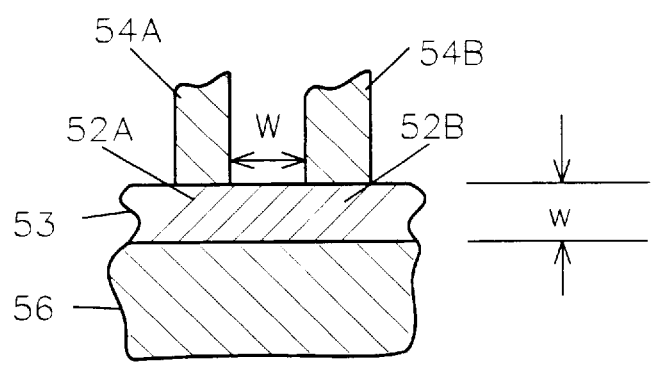
FIG. 4A is a magnified view of a portion of FIG. 4.

Referring to FIG. 4, in one preferred embodiment, the heater elements 52 are made of strip 53 of a resistive material deposited on the bottom surface of ceramic member 50, and connected to a plurality of leads 54 and a common ground terminal 56. Individual leads 54 are connected to electrical connectors 46, which are in turn operatively connected to a power supply and microcontroller 16. As shown in FIG. 4A, a magnified portion of FIG. 4, the spacing between leads 54A and 54B is approximately the same as width W (for example, W=0.003") of strip 53. Microcontroller 16 provides control signals 44 to a current source (not shown) that applies energizing current, for instance to lead 54A. The current flows from 54A to ground terminal 56 through a portion of resistive strip 53, which forms one heating element 52A. Ceramic member 50 also includes a relatively thin but hard layer of glass that covers strip 53 and the leads. The heating elements heat the corresponding pixels (i.e., dots) on the surface of the glass layer, and the surface is in contact with thermal foil 32. The temperature of a pixel depends on the amount of energy delivered to the corresponding heater element and the thermal history and instant printing condition of the printhead. Thermal printhead assembly 40 may use different printheads having resolution of 200, 300, or 400 dots per inch.

Microcontroller 16 receives a selected image from computer 12 and generates a data matrix corresponding to the image area. Importantly, the data matrix includes an enhancement of the image by electronic means to improve its visual appearance and physical character after the thermal transfer to surface 25 of article 26. The enhancement algorithm generates selected levels of energy delivered to each pixel at each position of stage 24, as opposed to application of the same energy condition to all pixels, as is frequently done, for example, in direct thermal printing. Thus, the data matrix can be visualized as a three- dimensional matrix with two-dimensional spatial information, and the energy level data, generated by the enhancement algorithm, represented as the third dimension. The enhancement algorithm is interactive, that is, capable of adjusting the individual levels of energy relative to the local shape of the image, the thermal history of the pixel, levels of energy applied to the neighboring pixels, the overall temperature of ceramic member 50 and heat sink 48, the morphology of surface 25, and the type of material to be thermally transferred. Furthermore, in certain embodiments, the enhancement algorithm uses a set of sensors distributed on printhead 42 that provide further input data for a dynamic analysis of the energy conditions for determining energy levels to be applied to the pixels.

The enhancement capabilities of the system enable high quality images to be printed that can be compared to those produced by various hot stamping techniques that use pressure dies.

Digital decorating system 10 can operate in different modes to produce different types of images on surface 25.

The first mode is achieved by direct application of heat and pressure from the surface of ceramic member 50 to surface 25 of article 26. As article 26 advances, printhead 42 applies to surface 25 pressure induced by force member 41 and heat selectively generated by the heater elements to thermally alter the material surface and thereby transfer the image. This mode does not use thermal foil assembly 30. The second mode of image transfer employs thermal foil assembly 30, as is described below. Other modes employ multiple printheads without foil, or with one or multiple foils or ribbons.

The enhancement algorithm employed in a particular system is selected in accordance with the mode of transfer, the desired image and the general operating parameters such as type of foil and type of substrate involved.

The second image transfer mode employs thermal foil assembly 30 to thermally transfer material to surface 25 and thereby create the image. Thermal foil 32 includes a thermally resistive carrier film, a light-transmissive lacquer layer that may include a coloring agent or pigment, a thin metal layer, and a thermally activated adhesive layer that includes resins and fillers that preferably includes a puffing agent. The carrier film is preferably back-coated with a heat-resistive lubricant. Between the carrier film and the lacquer layer there is a release coating, such as thermally responsive synthetic wax, which under heat releases the lacquer, metal and adhesive laminate from the carrier. The preferred thermal foil is described in detail in a co-pending U.S. patent application Ser. No. 08/789,578, filed Jan. 28, 1997, entitled "Thermal Foils for Digital Decorating," attorney docket no. 06456/005001, incorporated by reference.

In the second thermal transfer mode, stationary printhead 42 applies heat and pressure to foil 32 and surface 25, both of which move underneath printhead 42. As mentioned above, the enhancement algorithm controls the energy sequence delivered to each pixel of the image (and the pressure delivered by force member 41). Each pixel receives the energy from a current source or a voltage source. In a preferred embodiment, each pixel receives constant current over three time intervals while thermal foil 32 and substrate 25 move continuously at a low speed (2 mm/sec. to 25 mm/sec.) Alternatively, foil 32 and substrate can remain stationary during the three time intervals. Each interval lasts about one millisecond and the current is either on or off during the interval. Thus, this arrangement enables current profiling over each pixel. The image develops as the pixels transfer the material from thermal foil 32 to substrate 25. The energy sequence is chosen to account for the unique properties of different thermal foils 32. Specifically, foils 32 may include different thicknesses of the continuous metal layer that is thermally transferred to substrate 25 together with the lacquer and adhesive layers of the laminate. The metal laminate tends to separate from (or peel off of) the thermally resistive carrier film in flakes or small sheets of material, whereas continuity of the deposited material is desired to achieve a specular effect. This significantly differs from the thermal transfer of particulate or liquid like material, such as thermal ink.

The digital decorating system monitors and controls the overall temperature of printhead 42, which may include one or more temperature sensors. During the thermal transfer process, a current source delivers current pulses to the tiny heater elements 52, which in turn convey heat to thermal foil 32 and ceramic member 50. In general, approximately 20% of the generated heat is consumed by the thermal transfer process and about 80% is conducted away to ceramic member 50 and heat sink 48. Ceramic member 50 and heat sink 48 have a relatively large thermal mass for managing the heat transfer and providing stable thermal conditions. However, the large thermal mass sometimes also limits the operation of printhead 42, for example, in certain circumstances it may limit the available speed of the thermal transfer process. For images where heater elements need to deliver large amounts of heat in one area and small amounts in another area, the overall thermal management may be difficult. Furthermore, ceramic member 50 has only a limited ability to deal with localized hot spots or thermal overload. One preferred embodiment of printhead 42 includes a heat exchange unit constructed to actively cool or heat printhead 42 to achieve stable conditions. Active heating keeps the contact surface of printhead 42 preheated so that the print elements advantageously require less energy for the transition from non-printing to printing state, thus enabling fast operation. In other embodiments, active cooling is employed to increase the protection of the heater elements. The system for energizing the pixels over a range of energy transfer states is adapted to the particular heat management system employed.

Figure 5:
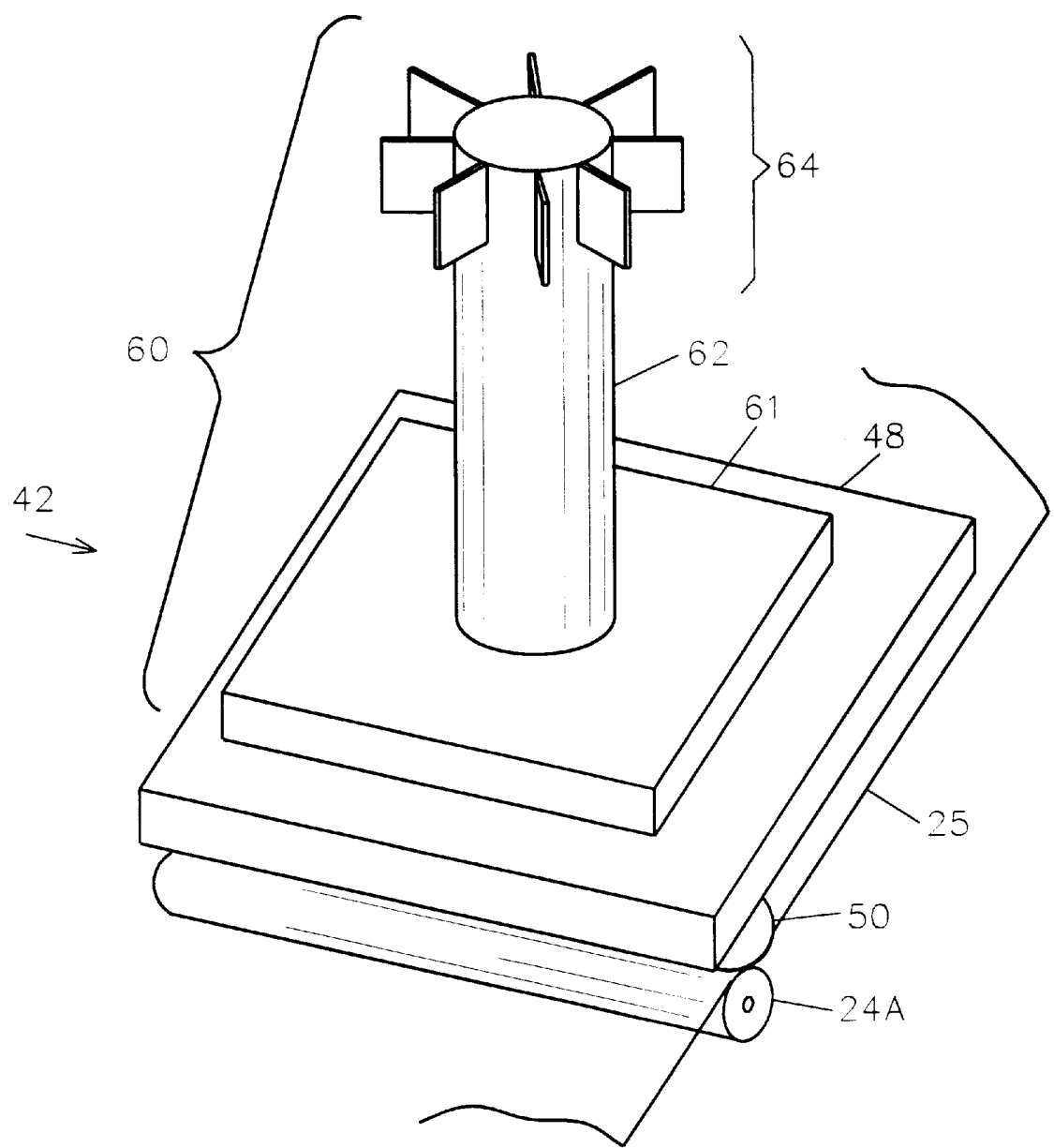
FIG. 5 is a simplified perspective view of a printhead with a heat pipe for maintaining a desired temperature.
Figure 5B:
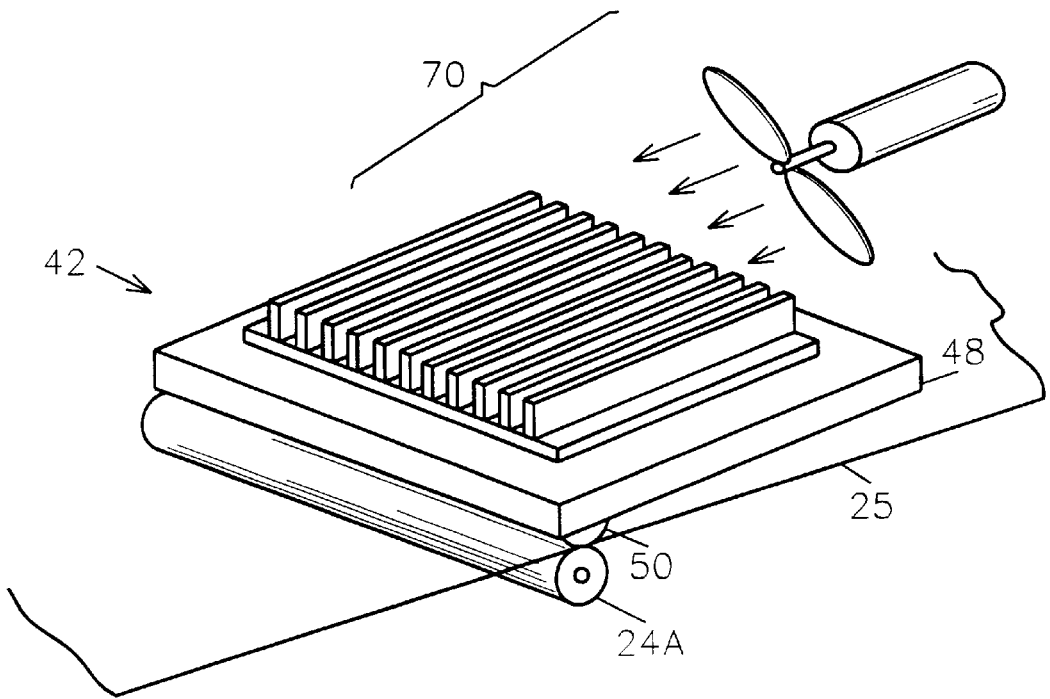
FIGS. 5A and 5B are simplified perspective views of printheads cooled by air.
Figure 5A:
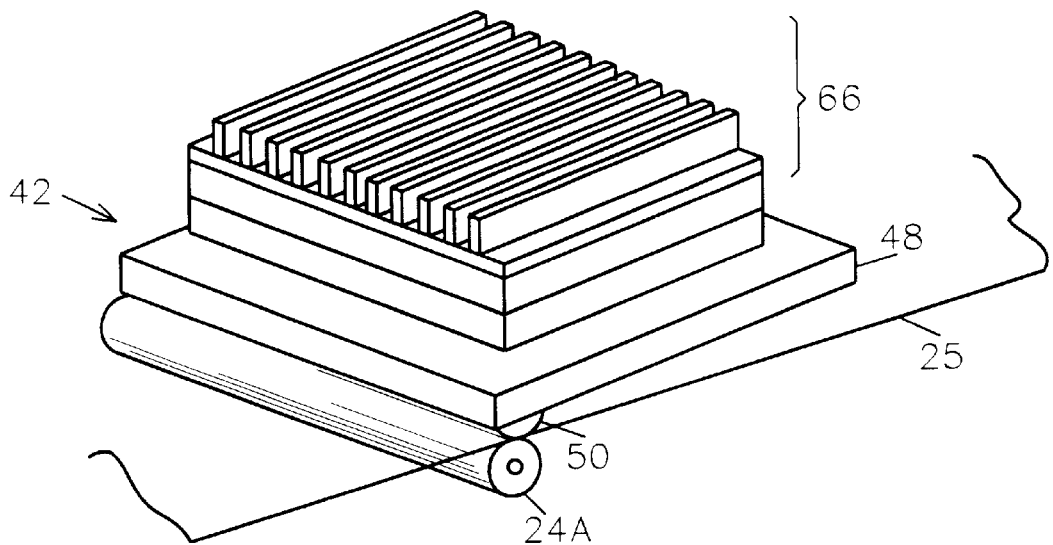

In certain embodiments, referring to FIGS. 5A and 5B, printhead 42 employs heat exchange units 66 or 70, which use air convection for cooling. In another embodiment, the heat exchange unit uses a set of thermoelectric elements placed in thermal contact with heat sink 48. The thermoelectric elements may be implemented to operate in a cooling mode or in a heating mode depending on the polarity of the current delivered to them by a power supply operatively connected to microcontroller 14. In certain preferred embodiments, the system algorithm interactively adjusts the printhead temperature as one parameter of the thermal transfer process.

In another embodiment, referring to FIG. 5, heat exchange unit 60 controls the overall temperature of printhead 48. As illustrated, heat exchange unit 60 includes a heat exchanger 61, a heat pipe 62, and a condenser with a set of cooling fins 64. Heat exchanger 61 includes a set of conduits extending relatively close to heater elements 52. The conduits are designed to carry a liquid with a high thermal capacity. Heat exchange unit 60 may be a closed system using a boiling liquid, wherein the liquid boils as it circulates near heater elements 52 and condenses in the condenser cooled by cooling fins 64. This boiling and condensing transfers a large quantity of heat for a given printhead size, and is capable of operating heater elements at a very small safety margin. Furthermore, the boiling liquid equilibrates local temperatures near heater elements 52; thus there is no need to employ a routine in this algorithm to adjust the energy levels to the individual heater elements to compensate for the overall temperature. The boiling liquid also provides a thermal ceiling for the heater temperature and can significantly raise the power ceiling of the heater elements, especially if the materials of the printhead are selected to have good thermal conductivity.

Figure 6:
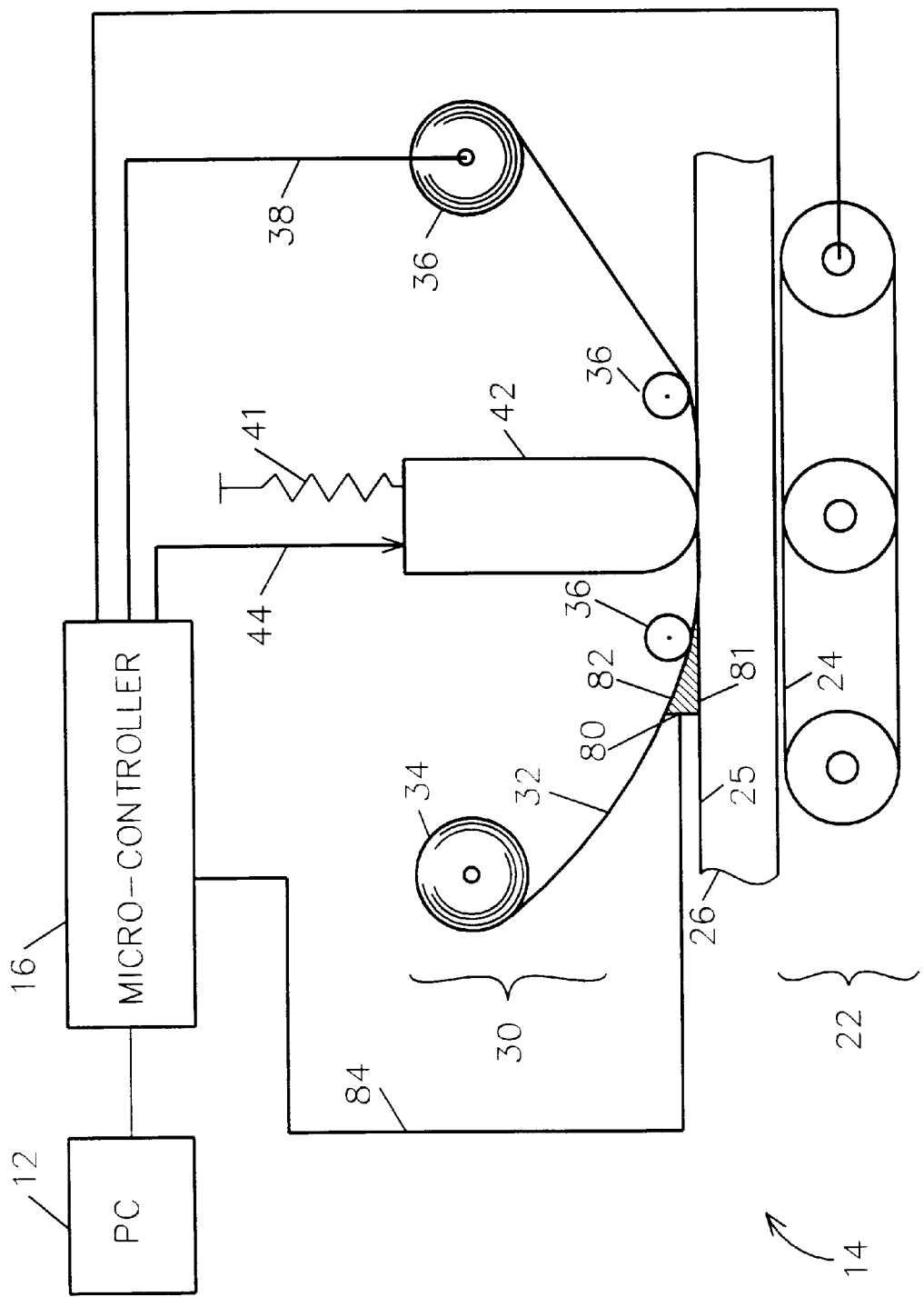
FIG. 6 is a diagrammatic side view of the thermal transfer system including a bulk heater for heating the substrate or the thermal foil.

Referring to FIG. 6, in another embodiment, thermal transfer system 10 employs a bulk heater 80 for preheating substrate surface 25 or thermal foil 32. Both surface 25 and thermal foil 32 have a relatively low heat capacity and thus, to preheat effectively, bulk heater 80 is located relatively close to the heater elements of printhead 42. Microcontroller 16 sends control signals (84) to bulk heater 80 and, in preferred embodiments, receives back temperature signals from thermal sensors located on the heating surfaces. In a substrate preheating mode, bulk heater 80 heats its surface 81, which provides heat to surface 25. One or more temperature sensors, embedded on surface 81, detect the temperature of surface 25 and provide a signal to microcontroller 16. Microcontroller 16 receives the temperature signal and adjusts the power provided to bulk heater 80 in a feedback arrangement. Depending on the material, the temperature of surface 25 is selected to soften material 26 and make it more receptive to printing (for example, in the case of vinyl), or it is selected to preheat material 26 to reduce the time needed for thermal transfer at each dot. The softening of heat-sensitive materials (i.e., vinyl) enables moderate pressures of the printhead to momentarily flatten the material in the thermal transfer region and improves thermal contact between the foil and the substrate. Similarly, in a foil preheating mode, bulk heater 80 heats its surface 82, which provides heat to thermal foil 32. Bulk heater 80 maintains the temperature of foil 32 at an elevated level, though sufficiently low so that no material migrates from the foil; subsequently, printhead 42 delivers a limited amount of power during the thermal transfer process to raise the temperature from the preheated, non-printing condition to a further elevated, printing condition.

Referring to FIG. 6A, in another embodiment, thermal transfer system 10 employs a second printhead 43, located in close proximity to printhead 42, for selectively preheating surface 25. By computer control, second printhead 43 preheats surface 25 only at the locations where printhead 42 subsequently transfers the metal foil to surface 25. The preheating improves adhesion of thermal foil 32. The preheating also enables "differential" heating of thermal foil 32 by delivering additional heat from preheated surface to the bottom layer of the foil. The preheating temperature, in certain preferred instances, is selected to be higher than the softening temperature and can even be selected to be so high as to alter the surface composition of surface 25 since any potential discoloration will be covered by the transferred foil. For example, heating the surface of vinyl above about 200° F. renders the selectively heated areas more receptive to the thermal deposition. These areas do not appear different to the naked eye, but common foil adhesives are found to selectively adhere to such a latent heat image relative to areas untouched by the heat. At these temperatures, components within the vinyl, such as monomers or plasticizers, migrate to the surface in heated areas and the foil adhesives adhere in an improved way to these compounds. Furthermore, for some materials, the high heat makes it possible to print more deeply into a textured surface. To maintain the registration, the printheads are preferably located close together. The control software communicates with both printheads. The control software advantageously provides adjustment to the timing and relative location of the two images on the print lines, enabling fine adjustment of registration by observing the thermal pattern and the transfer effect. The preheating area can thus be brought into precise registration with the following thermal transfer area.

Figure 6B:
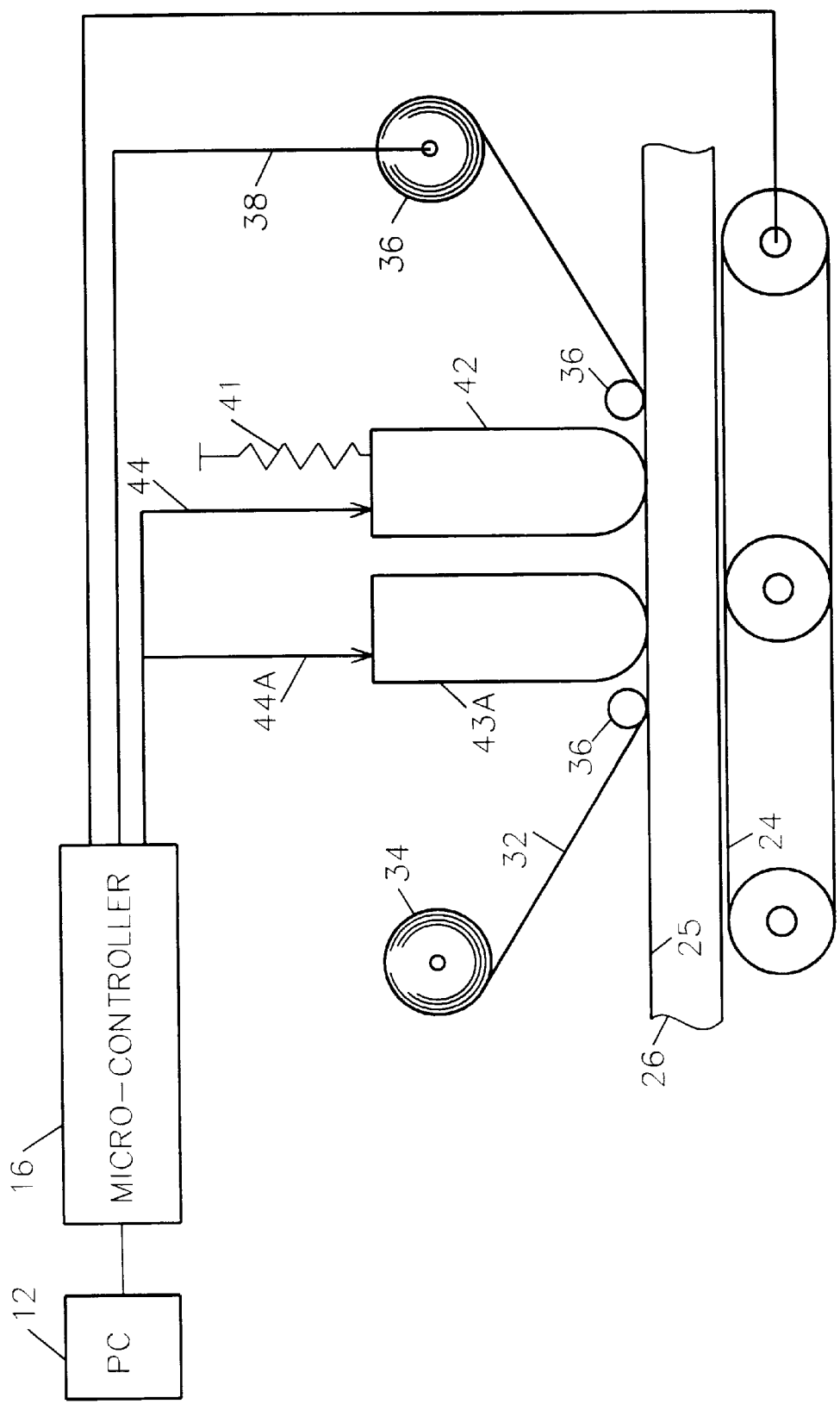

Alternatively, referring to FIG. 6B, thermal transfer system 10 employs a second printhead 43A for selectively preheating thermal foil 32. Printhead 43A can not only preheat thermal foil 32 but also thermally transfer an initial layer of material to surface 25. The initial layer pretreats surface 25 and can include a puffing material that fills valleys in the surface. Subsequently, printhead 42 thermally transfers the metal and lacquer layers with an additional adhesive layer to surface 25. In another embodiment, printheads 42 and 43A are arranged to transfer material from two separate thermal foils. The transferred images of the foils do not need to be identical, but, in certain advantageous arrangements, can be arranged and controlled to complement each other.

Figure 7:
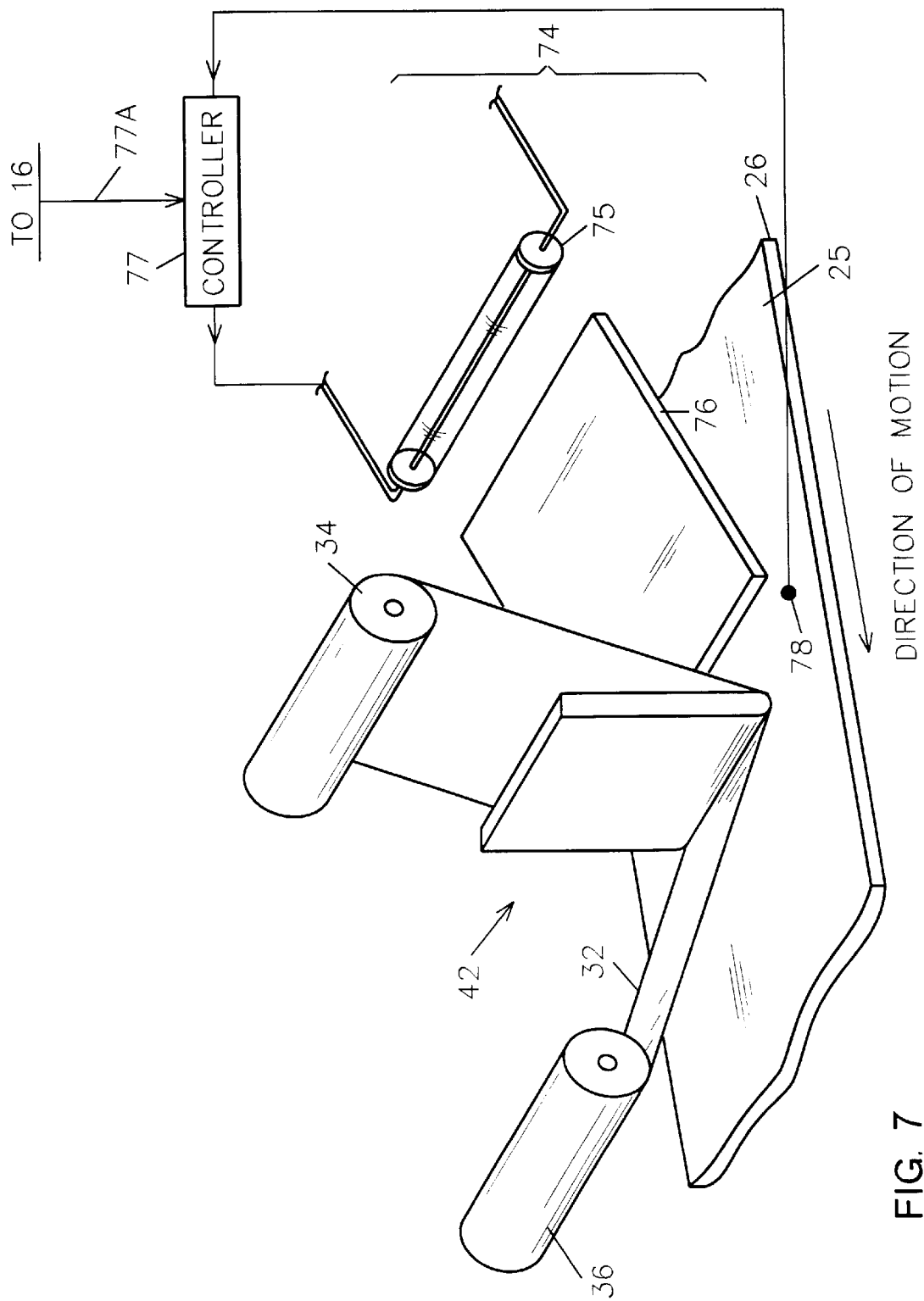
FIGS. 7 and 7A are simplified perspective views of the thermal transfer system designed for preheating the substrate.
Figure 7A:
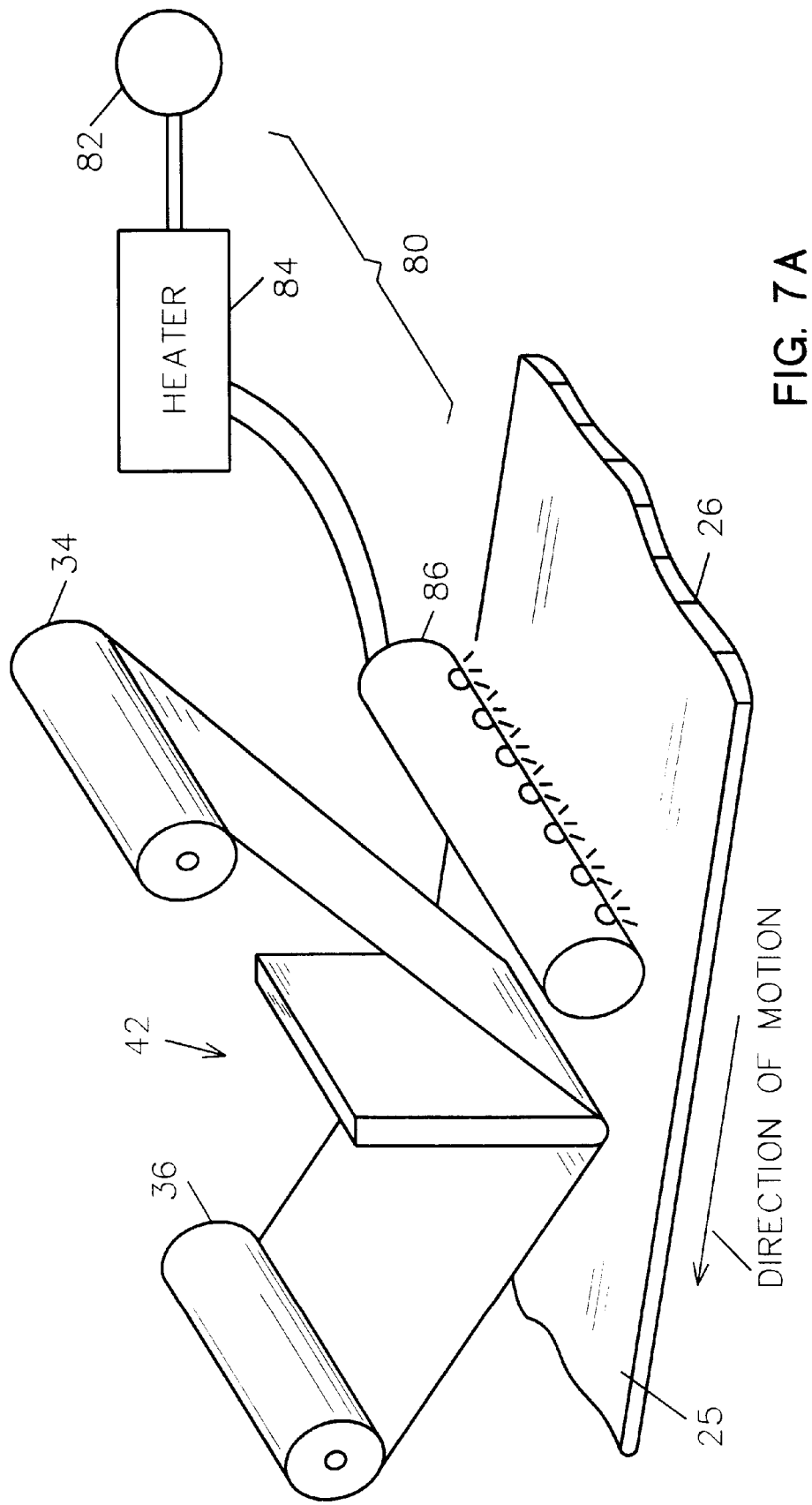

Referring to FIG. 7, a substrate heater 74 includes a heat lamp 75 (for example, an infrared lamp) coupled to a planar light guide 76, e.g., of quartz, constructed to deliver a line of the generated heat to surface 25. Microcontroller 16 sends control signals 77A to a controller 77, which regulates power delivered to heat lamp 75. A temperature sensor 78, or an array of them, located in thermal communication with substrate 25, measures the temperature of the substrate just before the substrate reaches the line of pixels at printhead 42. Temperature sensor 78 also provide feedback data to controller 77. This embodiment can use different temperature sensors, including a infrared sensor. In another embodiment, referring to FIG. 7A, a substrate heater 80 uniformly heats substrate 25 with hot air of a selected temperature. Substrate heater 80 includes an air pump or fan 82 and a heater 84 connected to a nozzle device 86, which delivers jets of hot air to substrate 25.

Referring now to the control aspects of the preferred system, in general, the enhancement algorithm includes specific advantageous thermal transfer techniques, referred to as "line enhancement," "edge enhancement," "lacquer protection" and "trailing edge." The "edge enhancement" technique enables the generation of clearly defined edges in the thermally transferred pattern, while enabling the fill area to provide a uniform, desirable appearance. In the edge enhancement technique, microcontroller 16 "looks" for initial transfer pixels and generates higher energy levels for pixels that form an edge, especially the leading edge of the image. Thus, the leading, peripheral pixels (i.e., edge pixels) are controlled to have a higher temperature than interior pixels; this creates an advantageous temperature gradient at the edge between heated and unheated regions. The temperature gradient enables the transferred material to separate from the material remaining on the foil in a well-defined manner relative to the heated pattern. This is particularly applicable to leading edges and side edges in a patterned area being progressively transferred.

Figure 8:
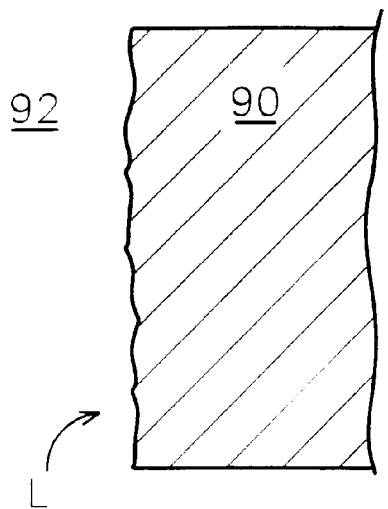
Figure 8A:
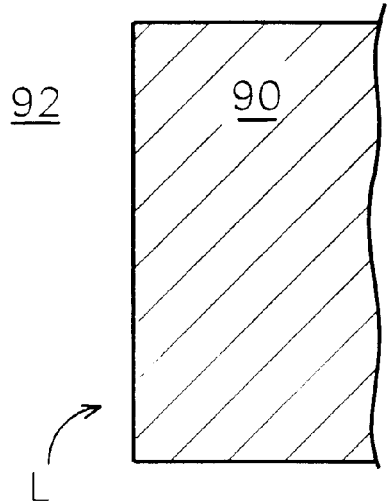
FIG. 8A is a magnified view of a smoother edge produced by an "edge enhancement" algorithm according to the present invention.

To create an optimal temperature gradient, microcontroller 16 also takes into account the temperature of ceramic member 50 and heat sink 48 and the temperature of surface 25. These temperatures may also be adjusted to create the optimal temperature gradient. The temperature gradient, in turn, enables a clean break and transfer of the lacquer, metal and adhesive layers. FIGS. 8 and 8A sketch the difference in the transferred image of line L, wherein the shaded areas 90 represent the layers laid down to form the image while the white areas 92 represent surface 25. As shown in FIG. 8, without the edge enhancement algorithm, the edge L tends to be irregular. On the other hand, as shown in FIG. 8A, the same edge produced by the edge enhancement algorithm is more regular in appearance. The energy considerations will be discussed specifically in connection with FIG. 10. In the filled area beyond the leading and side edges, microcontroller 16 directs a much lower energy to the pixels (i.e., interior "fill" pixels), where the image is also transferred. The lower energy heats the pixel to a temperature wherein the thermal transfer still occurs due to the selected properties of the metal foil, because a lower energy level is sufficient to continue the peeling and transfer process. The lower energy level decreases the generated heat, which prevents damage to the lacquer layer that can produce a tarnished appearance to the reflective decoration. This is the "lacquer protection" technique. There are no similar concerns in thermal printing, i.e., thermal transfer of ink. This enhancement algorithm is specific to thermal foils transferring metal.

Figure 9:
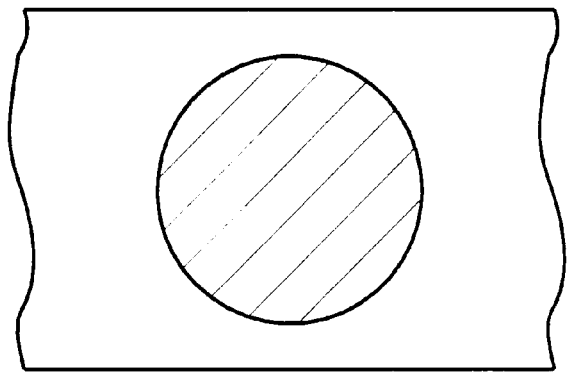
FIG. 9 is a diagrammatic view of a circular image to be thermally transferred to a substrate.
Figure 9B:
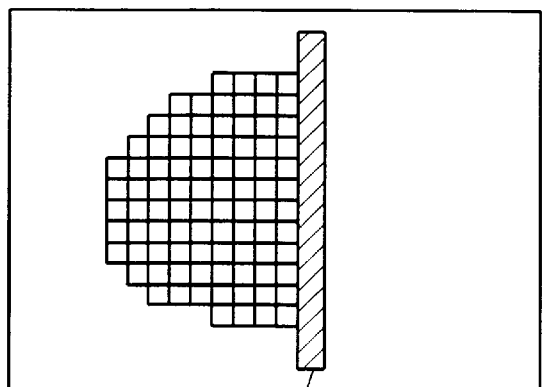
FIG. 9B is a highly magnified view of a portion of FIG. 9A.
Figure 9C:
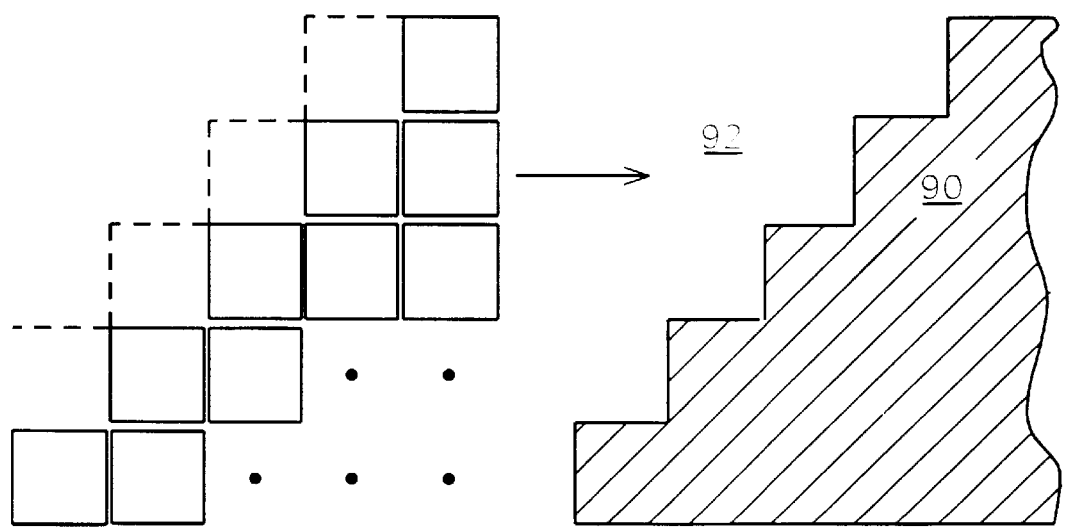
FIGS. 9C and 9D are highly magnified views of the transferred image employing the uniform energy distribution of FIG. 9A and a "line enhancement" algorithm according to the present invention, respectively.

The "line smoothing" routine in a novel way eliminates a stair-step appearance of lines or edges that lie diagonally to the direction of the thermal transfer motion. For example, if the image is a circular pattern, as shown in FIG. 9 (or any pattern with a line that lies at an acute angle to the direction of motion), a uniform distribution of energy over the matrix at the transfer points of the edge will generate a stair-step pattern of thermally transferred material (see FIG. 9A). This uniform application of energy and the thermally transferred material are shown in FIGS. 9B and 9C, respectively. According to the novel "line smoothing" routine, a low level of energy is applied to a pixel lying outwardly of the edge pixel (i.e., a pixel not assigned as part of the computer generated image) The result is that a decreased thermal gradient is produced at the edge in this instance, which produces less precisely defined lines that effectively smooth the line that would otherwise have a crisp stair step appearance.

Figure 9D:
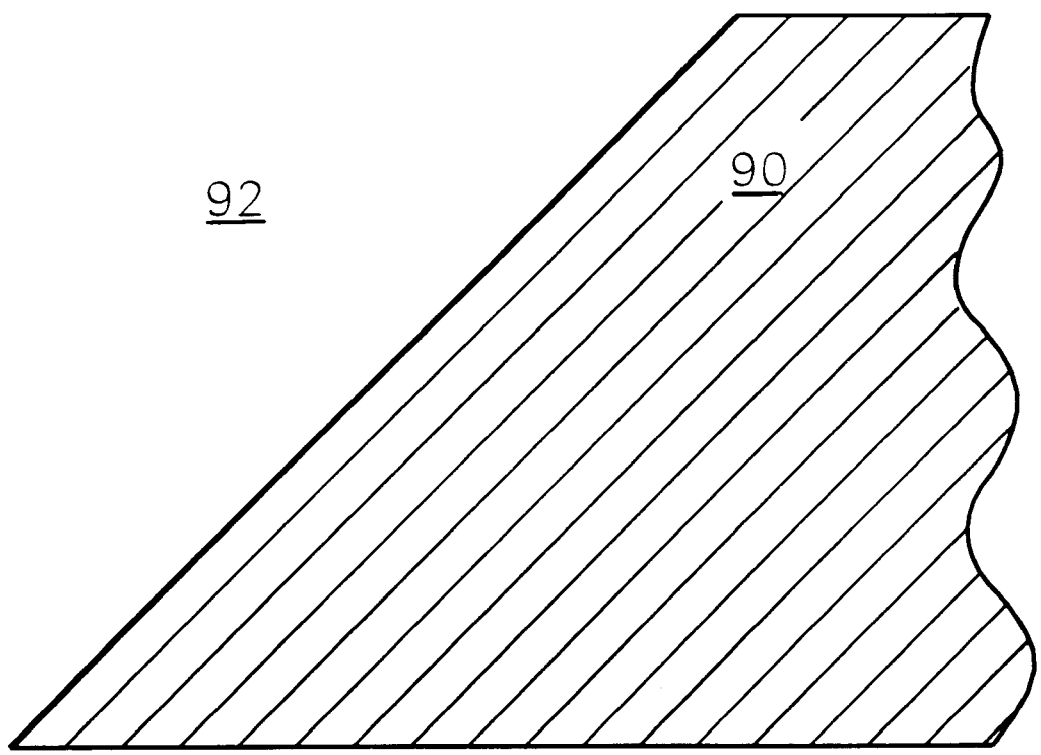

It is further realized that, in particular reduced heating of a "nonprinting" pixel that lies in the corner between two "printing" pixels that form the stair step produces the most heat concentration in the crotch or corner portion of the pixel next to the heated pixel. This causes transfer of the foil in this limited region to produce a desired smoothing effect. a partial material transfer occurs in a corner region of that pixel and a smoother appearance, as suggested in FIG. 9D, is achieved. In cases where pixels are of equal dimensions in both directions, the most effective angles for this algorithm lie at about 45 degrees to the thermal transfer axis, while a beneficial range is generally between about 30 degrees and 60 degrees for fine art work.

Figure 10:
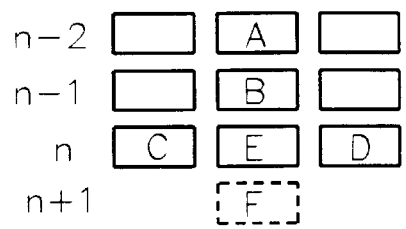
FIG. 10 is a diagrammatic view of pixels considered in an enhancement algorithm and a chart with different thermal transfer combinations considered by the algorithm.
Figure 10:
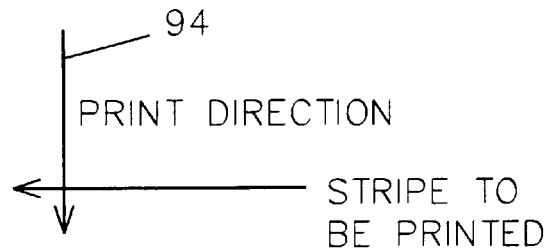

FIG. 10 illustrates in a simple way a matrix employed for implementing the enhancement techniques with respect to assigning different energy levels to the individual pixels of an image. (As mentioned above, the algorithm also takes into account the substrate and foil temperatures, the overall temperature of the printhead, the pressure, and the type of the substrate, but theses will be discussed separately.) On the top, FIG. 10 shows the rows and columns of pixels being printed by printhead 42 in print direction 94. The row "n" indicates the line of dots about to be transferred (or not transferred depending on the image), while the row "n−1" is a line that has been transferred in the preceding print stripe and "n-2" is a line that has been transferred in the stripe preceding "n-1." The algorithm has to assign an energy level to a pixel E. The algorithm "looks" at the pattern around pixel E of the image to be transferred. The chart in FIG. 10 indicates possible combinations of the transfer states for pixels A, B, C, and D, wherein "0" denotes no transfer, according to the computer-generated image, and "1" denotes material transfer. Overall, in this implementation there are 16 different combinations, but only 12 different energy possibilities, E1 through E12, because some of the patterns are essentially identical for thermal transfer purposes. For example, the material transfer at pixels B and C is identical to the material transfer at pixels B and D, assuming that the thermal conditions at pixel C and pixel D (due to the heating of their additional neighboring pixels, not shown) are identical. If there was no material transfer at the immediately preceding row "n−1," microcontroller 16 raises the energy of pixel E, and executes the edge enhancement algorithm. If there was material transfer in rows "n−2" and "n−1," microcontroller 16 directs lower energy to pixel E. This lower energy is either zero energy, if no transfer should occur at pixel E, or to an intermediate value, if material transfer should occur at pixel E. In the latter case, microcontroller 16 executes the "lacquer protection" routine, which prevents thermal damage to the lacquer layer. Additionally, if there was material transfer at pixel B, but not at its neighboring pixels in rows "n−1," (or there was material transfer at pixels A and B, but not at their neighboring pixels in rows "n−2" and "n−1") the algorithm "looks" for lines at an angle to the transfer direction. For example, if there is material transfer at pixels B and C, pixel E receives energy $E_5$, which is about three-quarters of the energy of pixels B and C. Furthermore, microcontroller 16 executes the "line smoothing" routine. The "Line smoothing" routine directs a small amount of energy to the corner pixel next to heated pixels B and C for partial transfer of material that removes the stairstep pattern, as described above. Similarly, if there is material transfer at pixels F and D, then microcontroller 16 directs a small amount of energy to pixel E for partial transfer. The algorithm can also "look at" the next succeeding stripe. If there is material transfer at pixels E, but no transfer at pixel F (or pixels of the "n+1" stripe), microcontroller 16 executes a "trailing edge" routine and pixel F receives no energy. In general, the "trailing edge" routine does not assign increased values of energy to the last transferred stripe, that is, there is no increased heating of the leading edge as executed by the "edge enhancement" routine. However, to break off the material to be transferred at the trailing edge, the thermal gradient may be needed for some types of thermal foils. This is again due to the unique properties of the metal layer that tends to break off clean at the trailing edge. A simplified version of the enhancement algorithm, in general, achieves very good results by only "looking at" a partial image and considering just a few transfer stripes.

Figure 11:
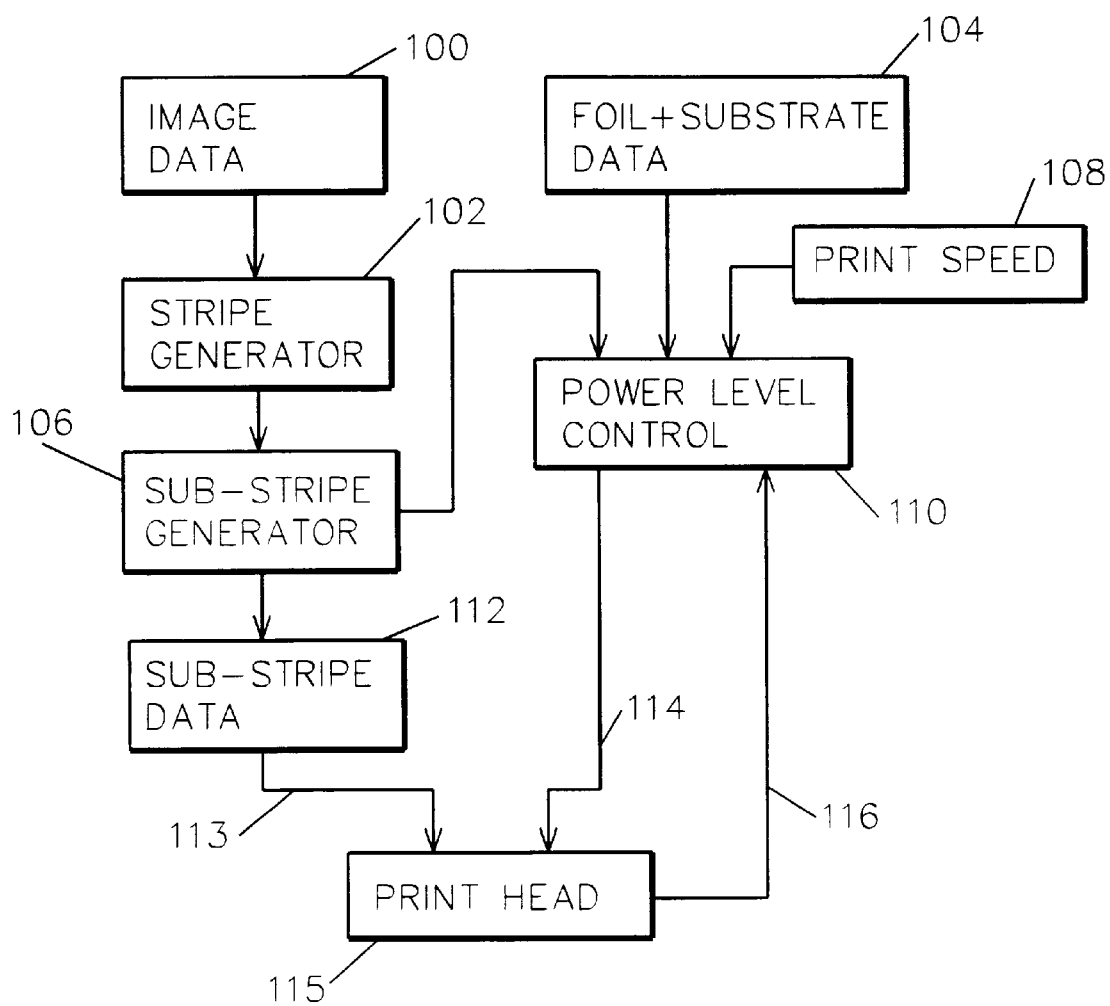
FIG. 11 is a block diagram of the thermal transfer algorithm.

FIG. 11 shows diagrammatically the thermal transfer algorithm. The computer provides image data (100) to a stripe generator 102, which analyzes each thermal line to be transferred and provides this to a sub-stripe generator 104. As is described below, sub-stripe generator 104 generates sub-stripe data (112) and the corresponding power (energy) control signals for a power controller 110. Power controller 110 also receives print speed data 108 and foil & substrate data and delivers current signals for each sub- stripe to the heater elements of the printhead. The printhead includes a temperature sensor that sends temperature data (116) to power controller 110.

Data kept for each dot (pixel) of the printhead (1=on) previous dot line:
this dot line:

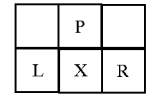

wherein
X=current state of dot X
P=previous state of dot X
L=current state, dot to left of X
R=current state, dot to right of X
Arrays kept for each line of data:

| | |
|---|---|
| * normal stripe [ ] | $\overline{X}$ for each dot of head |
| not current stripe [ ] | = $\overline{X}$ |
| not previous stripe [ ] | = $\overline{P}$ |
| not left stripe [ ] | = $\overline{L}$ |
| not right stripe [ ] | = $\overline{R}$ |
| * edge stripe [ ] | = $\overline{X} * (\overline{P} + \overline{L} + \overline{R})$ |

Time during which one row of data is printed is broken into 3 "substripe" intervals of equal duration. "Normal stripe [ ]" data is printed during the first two substripes, "edge stripe [ ]" data is printed during the third substripe. The nominal power for each sub-stripe can be adjusted independently and is corrected for head temperature.

Initialization:

(Function "Setup Printing ( )")

Cells "Compute Strobe Energy ( )" to build a look-up table "rollofftable [ ][ ]" which contains power settings for each possible head temperature data reading for each of the 3 "substripe" interval power levels.

Initializes image buffer data from a file, points to its start

Initializes data arrays Normal Stripe [ ], not Current Stripe [ ], not Prev Stripe [ ]

Initialize Sub Stripe number to 0

Initialize and start Sub Stripe rate timer & IRQ

Interrupt Service routine "SendStripe ( )", called from sub-stripe timer IRQ, does following:

sets strobe energy based on recent-average head-thermstor data and on current substripe number.

quits if done printing all data.

updates sub-stripe number, module 3.

if substripe=0 get NextStripe [ ] from image Buffer ptr, (updates normal Stripe [ ] not Current Stripe [ ], not Prev Stripe [ ]

shifts normal Stripe [ ] to head for printing @ substripe #1 energy level)

else if substripe=1 leaves head data unchanged (normal Stripe [ ] data continues printing @ substripe #1 energy level)

calls "build Edge Stripe ( )" to compete not Left Stripe [ ], not Right Stripe [ ], and finally Edge Stripe [ ]

else if substripe=2 shifts Edge Stripe [ ] data to head for printing at substripe #2 energy level

Figure 12:
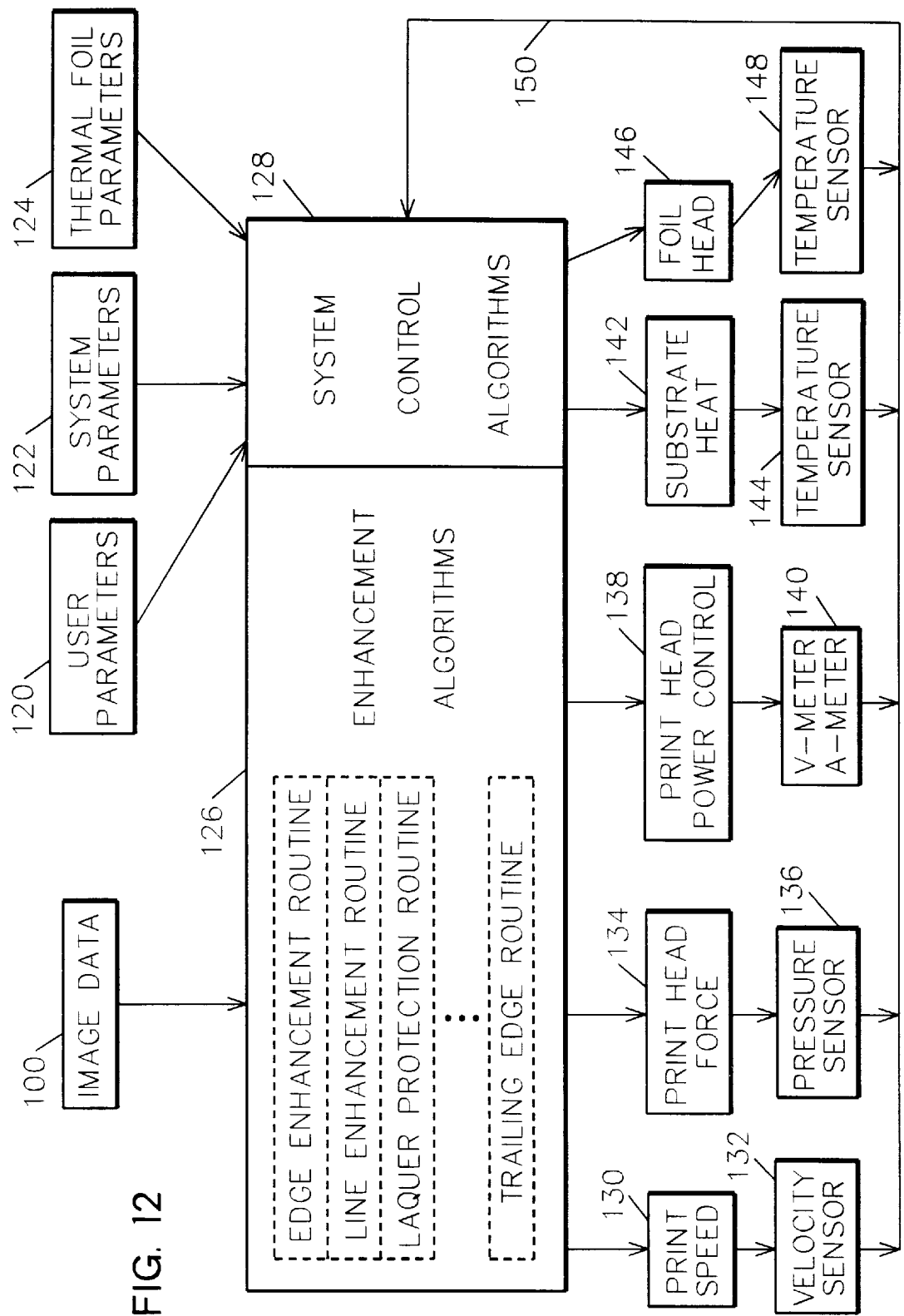
FIG. 12 is a block diagram of the overall organization of the digital decorating system.

FIG. 12 shows a block diagram of the overall organization of digital decorating system 10. Microcontroller 16 runs the enhancement algorithms (126) and the system control algorithms (128). Microcontroller 16 receives image data 100, user parameters 120, system parameters 122 and thermal foil parameters 124. User parameters 120 include information about the object and surface being decorated. System parameters 122 includes manufacturer information as the printhead rating, the heater ratings and other. Thermal foil parameters 124 are parameters unique to the foil currently used. Microcontroller 16 controls print speed 130, printhead force 134, printhead power 138, substrate heat 142 and foil heat 146 and can receive their actual values, measured by sensors 132, 136, 140, 144, and 148 in a feedback loop 150.

The thermal transfer system transfers the lacquer, metal and adhesive laminate to form a high quality image. The transferred metal has a smooth surface covered by the light-transmissive lacquer layer that may include pigment of a selected color. The lacquer layer protects the metal layer and provides a selected appearance.

What is claimed is:

1. A digital decorating system for transferring an image to a surface of an article, comprising:

a thermal printhead including a plurality of energizable heater elements to deliver heat to a thermal line of pixels on a surface of said printhead;

an advancing mechanism to produce relative movement between said printhead and the surface of the article;

a force member to exert a pressure between said thermal line of pixels and the surface of the article; and a microcontroller operatively connected via control lines to said printhead, said force member and said advancing mechanism, to provide, via control signals carried by said control lines, energy to said thermal line, to cause said relative movement and to thermally transfer the image to the surface of the article;

said microcontroller operable to classify said pixels corresponding to said image into perimeter pixels that form an edge of the image disposed along a diagonal with respect to the thermal line of pixels of the printhead, wherein a first one of said perimeter pixels of said image and a second of said perimeter pixels, form a portion of the edge of said image along the diagonal relative to said thermal line, and said microcontroller is operable to provide to said first and second perimeter pixels an energy level above a threshold level of energy required for thermal transfer of material from said thermal foil and to provide to a neighboring pixel outside of the image and in a corner neighboring said first and second perimeter pixels a non-zero energy level that is below said threshold level.

2. The digital decorating system of claim 1 wherein said thermal line of pixels are pressed directly onto the surface of the article to transfer the image to the surface of the article.

3. The digital decorating system of claim 1 further comprising a thermal foil, including a metallic layer, located between said thermal line and the surface of the article.

4. The digital decorating system of claim 3 wherein said microcontroller enables said thermal printhead via said control signals to provide to at least one of said perimeter pixels an energy level substantially above a threshold level of energy required for thermal transfer of material from said thermal foil to produce a substantial gradient of temperature between said at least one perimeter pixel and one of neighboring pixels outside of said image, said substantial gradient enhancing the thermal transfer of said metallic layer to the surface of the article.

5. The digital decorating system of claim 4 wherein one of said pixels of the plurality of pixels is an interior pixel and said microcontroller produces a control signal to cause said printhead to provide to said interior pixel an energy level below said energy level delivered to said perimeter pixel.

6. The digital decorating system of claim 3 further comprising a surface heater located near said thermal line, said surface heater to preheat said surface immediately before said surface of said article reaches said thermal line.

7. The digital decorating system of claim 1 wherein said diagonal is disposed at an acute angle from about degrees to about 60 degrees with respect to the thermal line of pixels.

8. The digital decorating system of claim 1 wherein a third one of said perimeter pixels immediately precedes at least one of said neighboring pixels outside of said image that received energy substantially below said threshold level, said microcontroller programmed to provide via said control signals to said third perimeter pixel a second energy level substantially above said threshold level to produce a substantial gradient of temperature between said third perimeter pixel and the neighboring pixel, said substantial gradient causing thermal transfer of said metallic layer to said surface of said article.

9. The digital decorating system of claim 1 wherein a fourth one of said perimeter pixels immediately follows at least one pixel of the plurality of pixels that is an interior pixel, and said microcontroller provides to said fourth perimeter pixel an energy level about equal to said threshold level to cause thermal transfer of said metallic layer to said surface of said article.

10. The digital decorating system of claim 1 wherein said printhead includes a heat sink and a thermal exchange unit thermally connected to said thermal line to deliver or remove heat from said heat sink.

11. The digital decorating system of claim 10 wherein said thermal exchange unit cools said printhead.

12. A computer controlled thermal decorator comprises:
a printhead, having a set of heater elements to thermally transfer a line of material from a thermally transferable foil as a line of pixels of said material to a substrate;
an advancing mechanism to produce relative movement between the printhead and the substrate, enabling thermal transfer of material as a plurality of lines of pixels to form a deposited image; and
a controller controlling said printhead to print a current line of the plurality of lines as a series of substripes with a first said substripe printed in accordance with normal stripe data corresponding to a portion of image data provided to the printhead, and a last one of said substripes printed in accordance with edge stripe enhancement data, wherein
said controller classifies pixels corresponding to said image into perimeter pixels and interior pixels and controls energy levels delivered to produce heat at said perimeter pixels and interior pixels in accordance with the level of energy previously delivered to said pixel, and to levels of energy delivered to said neighboring pixels, and to a level of energy required at said pixel to thermally transfer said thermally transferable foil, and one of said pixels is a perimeter pixel of a portion of the image to be printed that, together with neighboring perimeter pixels, form a line of said of portion of the substrate to be printed at an acute angle relative to said thermal line, said controller providing to said perimeter pixel an energy level above a threshold level of energy required for thermal transfer of material from said thermal foil, and said controller providing to a neighboring pixel outside of said portion of the substrate to be printed and in a corner between two of said perimeter pixels a non-zero energy level that is below said threshold level.

13. The computer controlled thermal decorator of claim 12, wherein said controller further controls said printhead such that for the pixels in the line of pixels, the controller adjusts a level of energy to be applied to the set of heater elements in respect to the pixels.

14. The computer controlled thermal decorator of claim 12 wherein the edge stripe enhancement data is given for a line by an array of data for dots in the head as, $\overline{X}*(\overline{P}+\overline{L}+\overline{R})$, where $\overline{X}$ is a complement of current stripe for each dot in the head, $\overline{P}$ is a complement of the previous stripe, $\overline{L}$ is a complement of the left stripe, and $\overline{R}$ is a complement of the right stripe.

15. The computer controlled thermal decorator of claim 12 wherein power delivered to said printhead for each substripe is independently adjusted.

16. The computer controlled thermal decorator of 12, wherein said foil further comprises a thermal foil, including a metallic layer, located between said printhead and the substrate.

17. The computer controlled thermal decorator of claim 12 wherein one of the pixels is a perimeter pixel relative to a portion of the image and said controller provides to said perimeter pixel an energy level substantially above a threshold level of energy required for thermal transfer of material from said thermal foil to produce a substantial gradient of temperature between said perimeter pixel and a neighboring pixel outside of a portion of the image, said substantial gradient enhancing the thermal transfer of said metallic layer to said surface.

18. The computer controlled thermal decorator of claim 12 wherein said acute angle is from about 30 degrees to about 60 degrees.

19. The computer controlled thermal decorator of claim 12 wherein said perimeter pixel immediately precedes several of said pixels that received energy substantially below said threshold level, said controller provides to said perimeter pixel, via the control signals, an energy level substantially above said threshold level to produce a temperature gradient between said perimeter pixel and the neighboring pixel, said gradient causing thermal transfer of said metallic layer to said surface.

20. The digital decorating system of claim 19 wherein said perimeter pixel immediately follows several of said pixels that are interior pixels, said controller provides to said perimeter pixel an energy level about equal to said threshold level to cause thermal transfer of said metallic layer to said surface.

21. The computer controlled thermal decorator of claim 20 wherein said pixel is one of said interior pixels and said controller provides to said interior pixel an energy level below said energy level delivered to said perimeter pixel.

22. The computer controlled thermal decorator of claim 12 wherein said printhead includes a heat sink and a thermal exchange unit in thermally communication with said printhead elements to deliver or remove heat from said heat sink.

23. The computer controlled thermal decorator of claim 22 wherein said thermal exchange unit cools said printhead.

24. The computer controlled thermal decorator of claim 22 further comprising a surface heater located near said thermal line, said surface heater disposed to preheat said surface immediately before said surface reaches said printhead. surface.

25. A method for thermally transferring an image to a rough surface of an article, the method comprising:
providing a thermal foil;
transferring from the thermal foil a stripe of thermal foil material to provide the image to the surface of the article by delivering an amount of heat to each pixel of a thermal line of pixels on a printhead and energizing heater elements of said printhead with data corresponding to the stripe of the image to be transferred;
pressing said printhead against the thermal foil and said surface of said article; and
causing relative movement between said printhead and said surface while thermally transferring said image to said rough surface, wherein
said transferring includes:
finding a perimeter pixel of said image that together with neighboring perimeter pixels forms a line of said image at an acute angle relative to said thermal line,
providing to said perimeter pixel an amount of heat above a threshold amount of heat required for thermal transfer of material from said thermal foil, and
providing to a pixel, located outside of said image and neighboring two perimeter pixels, a non-zero energy level below said threshold level.

26. The method of claim 25 wherein said article is comprised of a material selected from the group consisting of vinyl, leather, plastic, textile and paper.

27. The method of claim 25 wherein said pressing further comprises pressing the thermal foil, with the thermal foil including a specular metallic layer, between the printhead and the surface of said article while thermally transferring the stripe of thermal foil material from the thermal foil to surface of said article.

28. The method of claim 25 wherein said transferring includes providing to a perimeter one of said pixels an amount of heat substantially above a threshold amount of heat required for thermal transfer of material from said thermal foil to produce a temperature gradient between said perimeter pixel and a neighboring one of said pixels outside of said image, said gradient enhancing the thermal transfer of said metallic layer to said surface.

29. A method for thermally transferring an image to a rough surface of an article, comprising:

transferring a stripe of said image to the surface of the article as a series of substripe transfers, with a first substripe transfer including, delivering first an amount of heat to each pixel of a thermal line of pixels on a printhead by energizing heater elements of said printhead with data corresponding to the image to be transferred, and with a subsequent one of the series of substripe transfers including, delivering second an amount of heat to each pixel of the thermal line by energizing heater elements of said printhead with data corresponding to an edge enhancement transfer, and causing relative movement between said printhead and said surface while thermally transferring said image to said rough surface, wherein said transferring includes:

finding a perimeter pixel of said image that together with neighboring perimeter pixels forms a line of said image at an acute angle relative to said thermal line, providing to said perimeter pixel an amount of heat above a threshold amount of heat required for thermal transfer of material from said thermal foil, and providing to a pixel located outside of said image and neighboring two perimeter pixels, a non-zero energy level below said threshold level.

30. The method of claim 29 further comprises pressing a thermal foil that includes a specular metallic layer between the printhead and said surface of said article while thermally transferring material from the foil to the surface of said article.

31. The method of claim 29 wherein said transferring includes providing to a perimeter one of said pixels an amount of heat substantially above a threshold amount of heat required for thermal transfer of material from said thermal foil to produce a temperature gradient between said perimeter pixel and a neighboring one of said pixels outside of said image, said gradient enhancing the thermal transfer of said metallic layer to said surface.

32. The method of claim 29 wherein said transferring includes determining a perimeter pixel of said image that adjoins an interior pixel, and providing to said perimeter pixel an amount of heat about equal to a threshold amount of heat required for thermal transfer of material from said thermal foil.

33. The method of claim 29 further comprising providing a heat sink thermally connected to said thermal line, and conducting heat between said heat sink and an exchange unit.

34. The method of claim 29 further comprising preheating a portion of said surface of said article immediately before said portion reaches said thermal line.

35. The method of claim 34 further comprising:

preheating a portion of said thermal foil immediately before said portion reaches said thermal line.

* * * * *